Oct. 24, 1967 A. C. AVRIL 3,348,818
APPARATUS AND METHOD FOR BLENDING DRY MATERIALS
Filed Feb. 12, 1965 16 Sheets-Sheet 1

INVENTOR.
Arthur C. Avril.
BY Wood, Herron & Evans.
ATTORNEYS.

Oct. 24, 1967    A. C. AVRIL    3,348,818
APPARATUS AND METHOD FOR BLENDING DRY MATERIALS
Filed Feb. 12, 1965    16 Sheets-Sheet 4

INVENTOR.
Arthur C. Avril.
BY
Wood, Herron & Evans.
ATTORNEYS.

Oct. 24, 1967  A. C. AVRIL  3,348,818
APPARATUS AND METHOD FOR BLENDING DRY MATERIALS
Filed Feb. 12, 1965  16 Sheets-Sheet 5
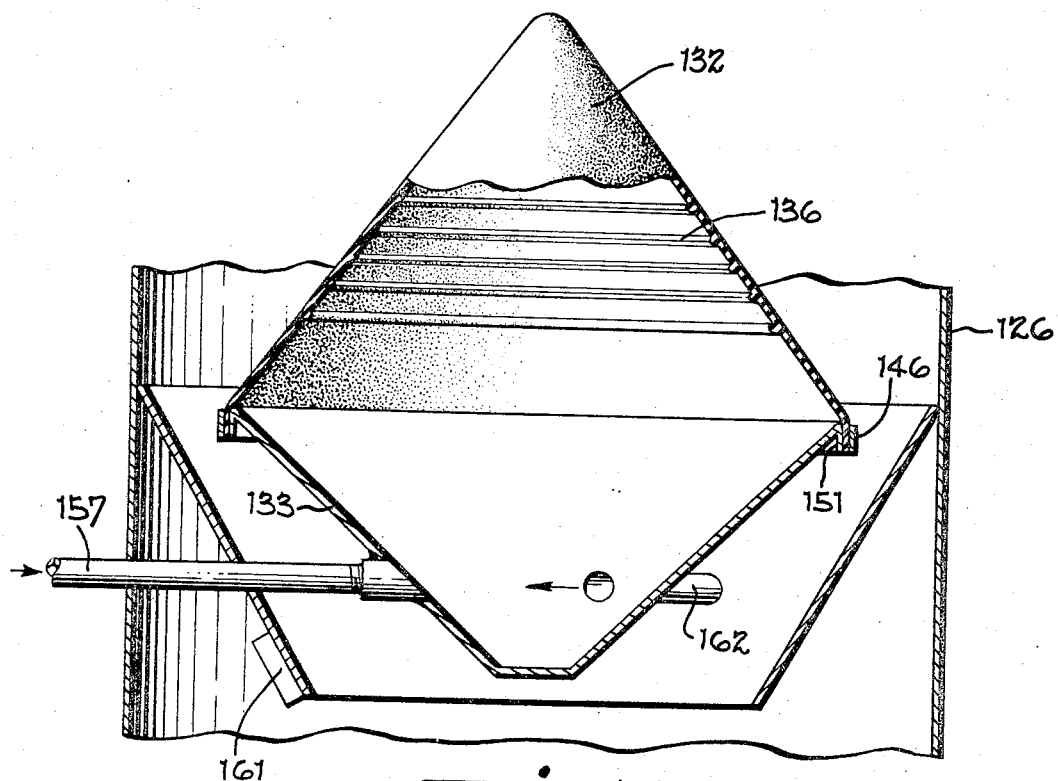
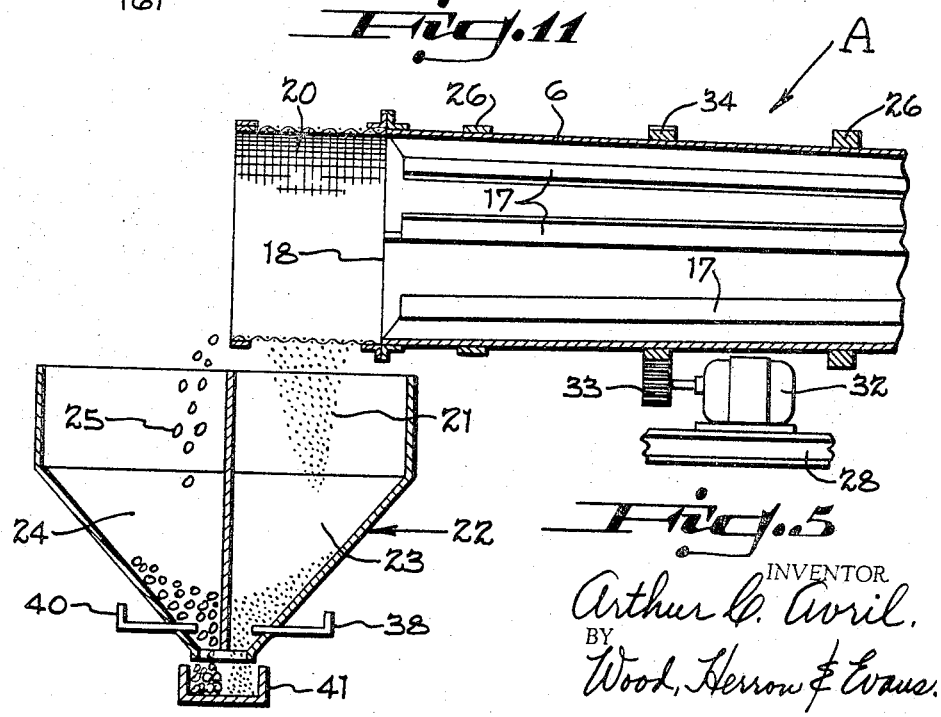
INVENTOR.
Arthur C. Avril.
BY
Wood, Herron & Evans.
ATTORNEYS.

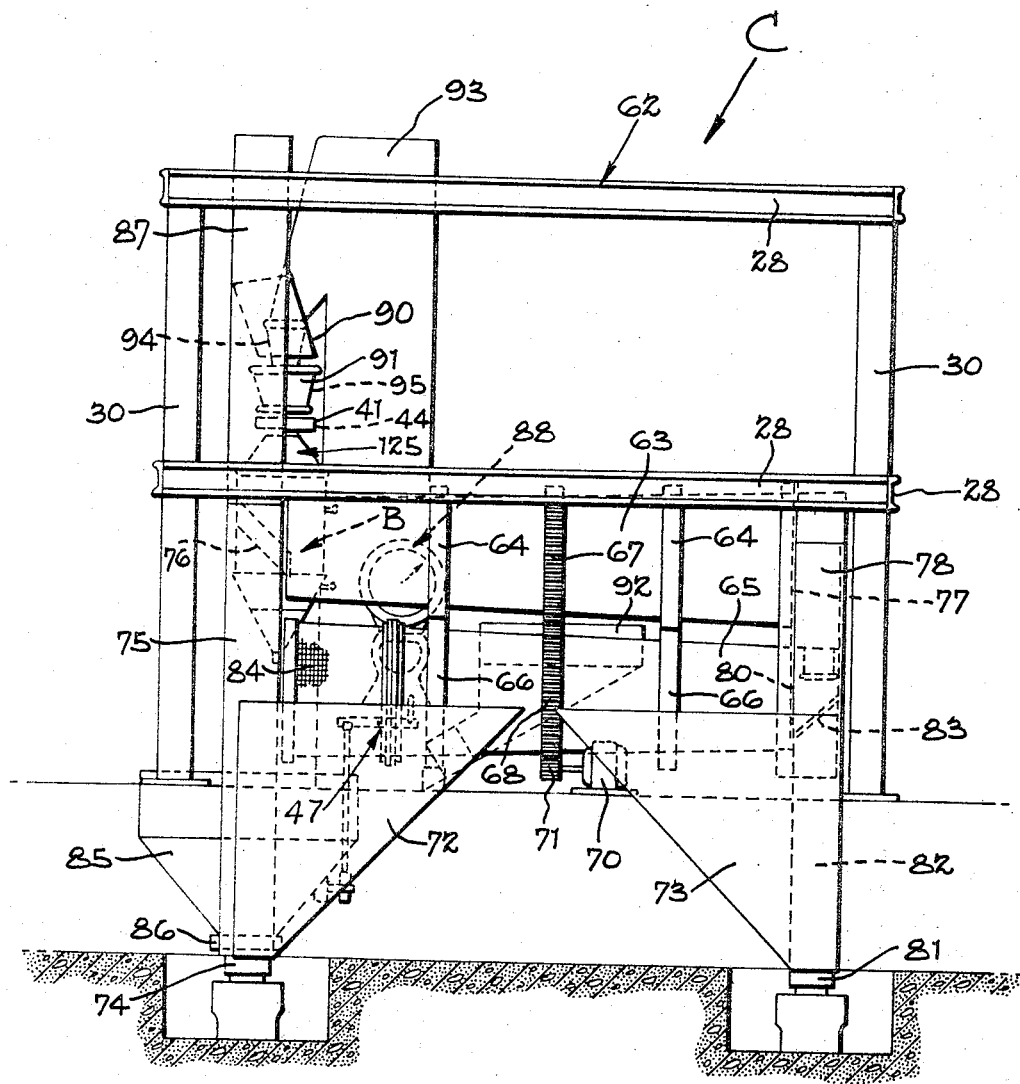

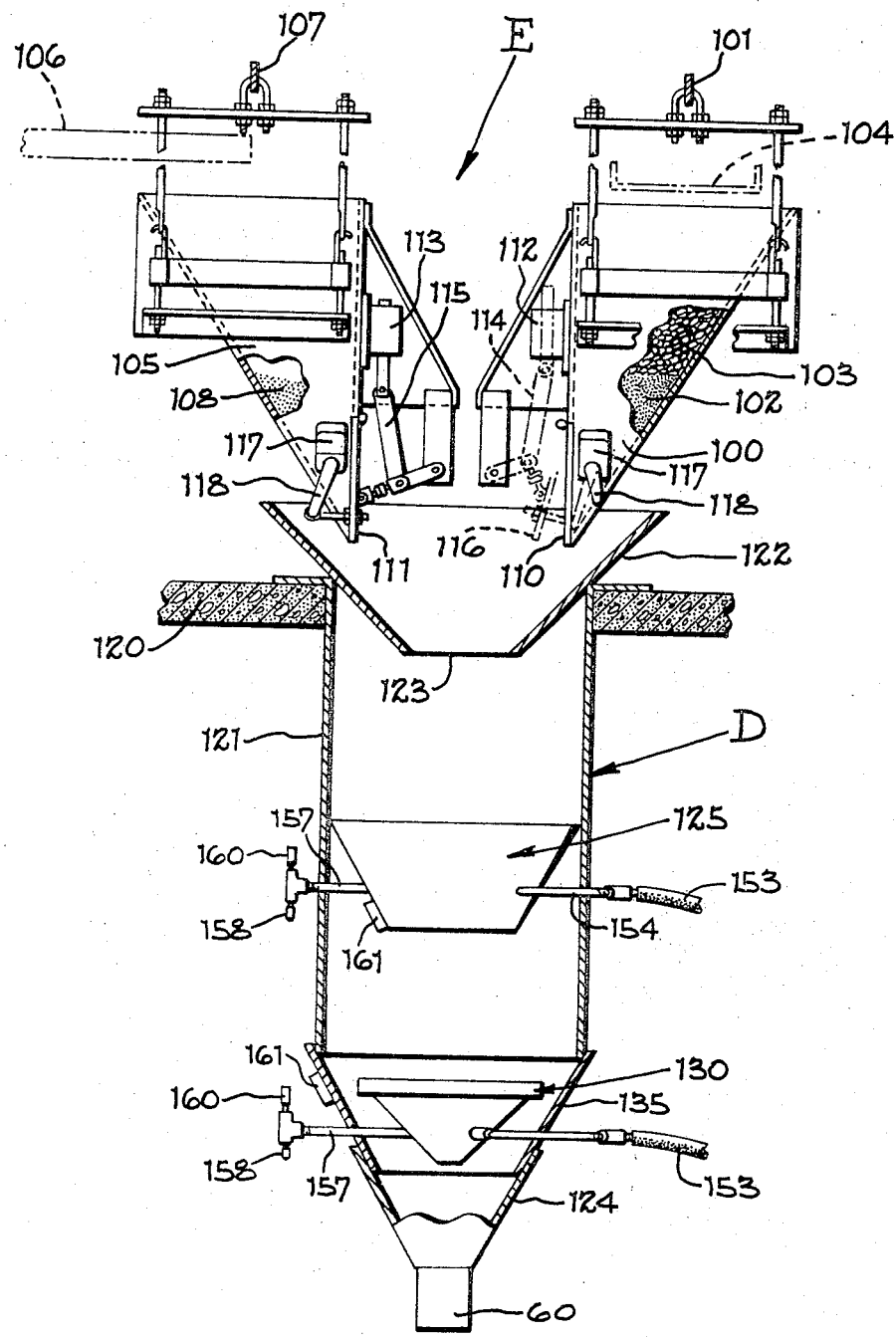

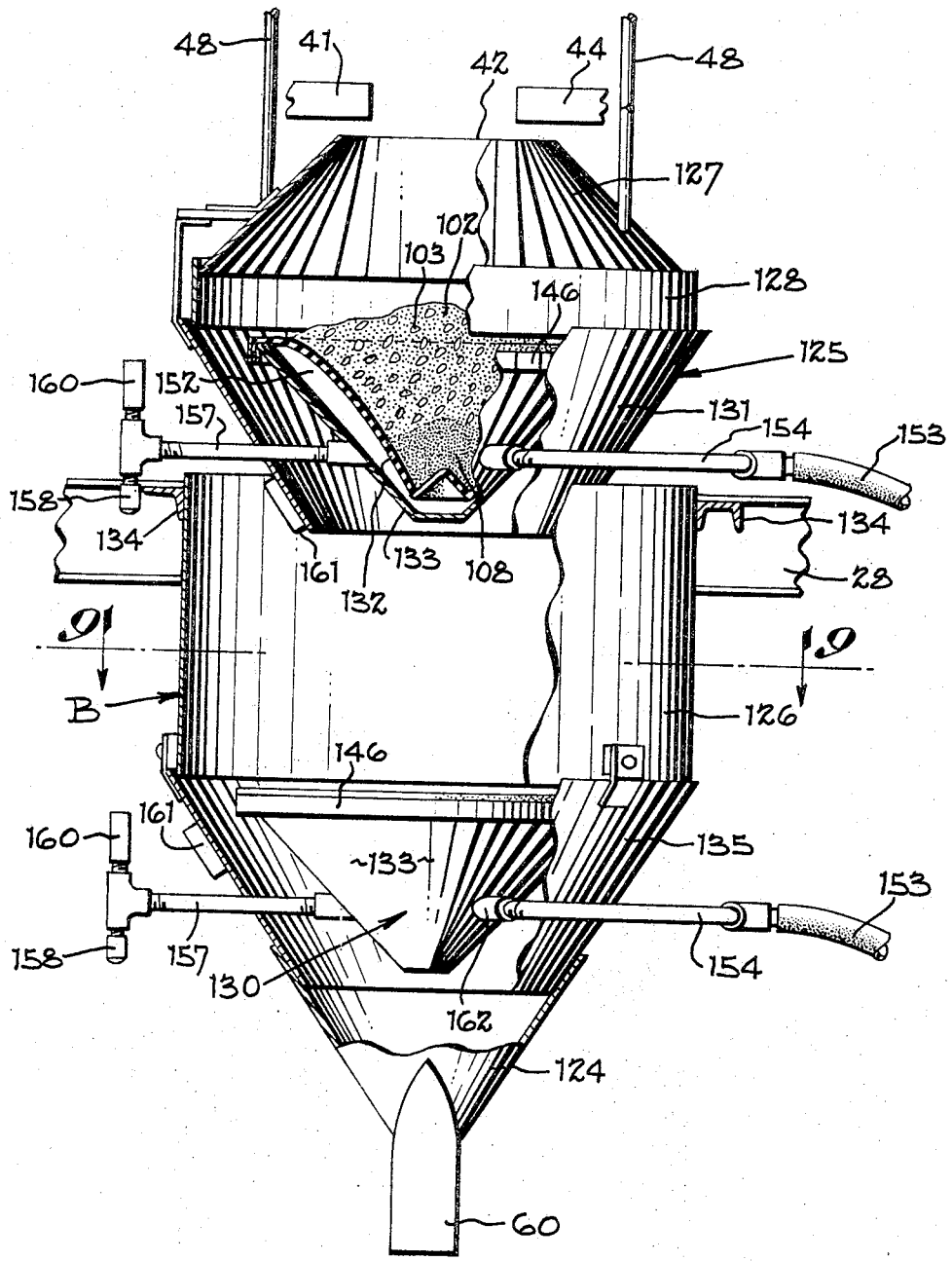

Oct. 24, 1967     A. C. AVRIL     3,348,818
APPARATUS AND METHOD FOR BLENDING DRY MATERIALS
Filed Feb. 12, 1965     16 Sheets-Sheet 9

INVENTOR.
Arthur C. Avril.
BY Wood, Herron & Evans.
ATTORNEYS.

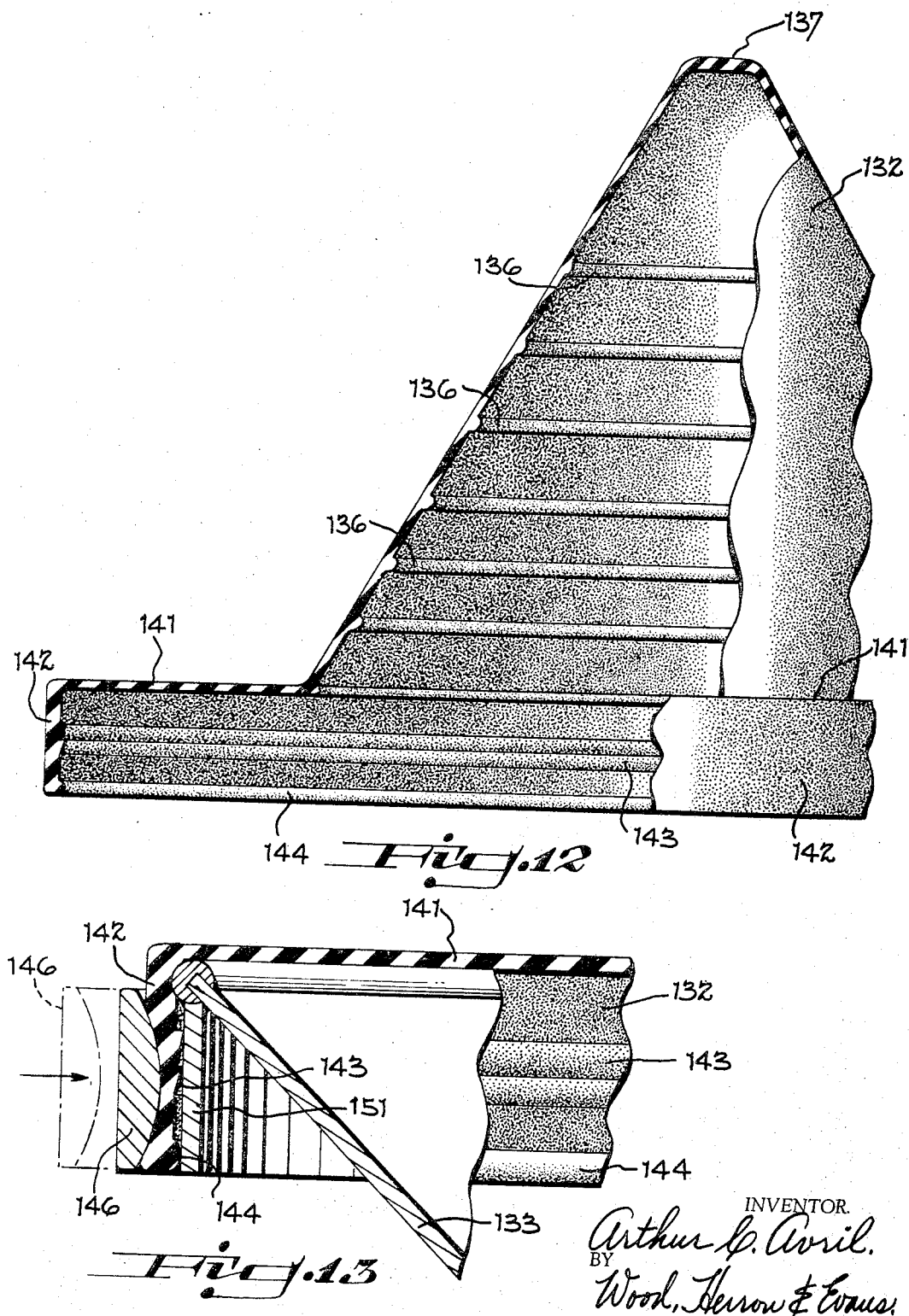

Oct. 24, 1967  A. C. AVRIL  3,348,818
APPARATUS AND METHOD FOR BLENDING DRY MATERIALS
Filed Feb. 12, 1965  16 Sheets-Sheet 11

INVENTOR.
Arthur C. Avril.
BY
Wood, Herron & Evans.
ATTORNEYS.

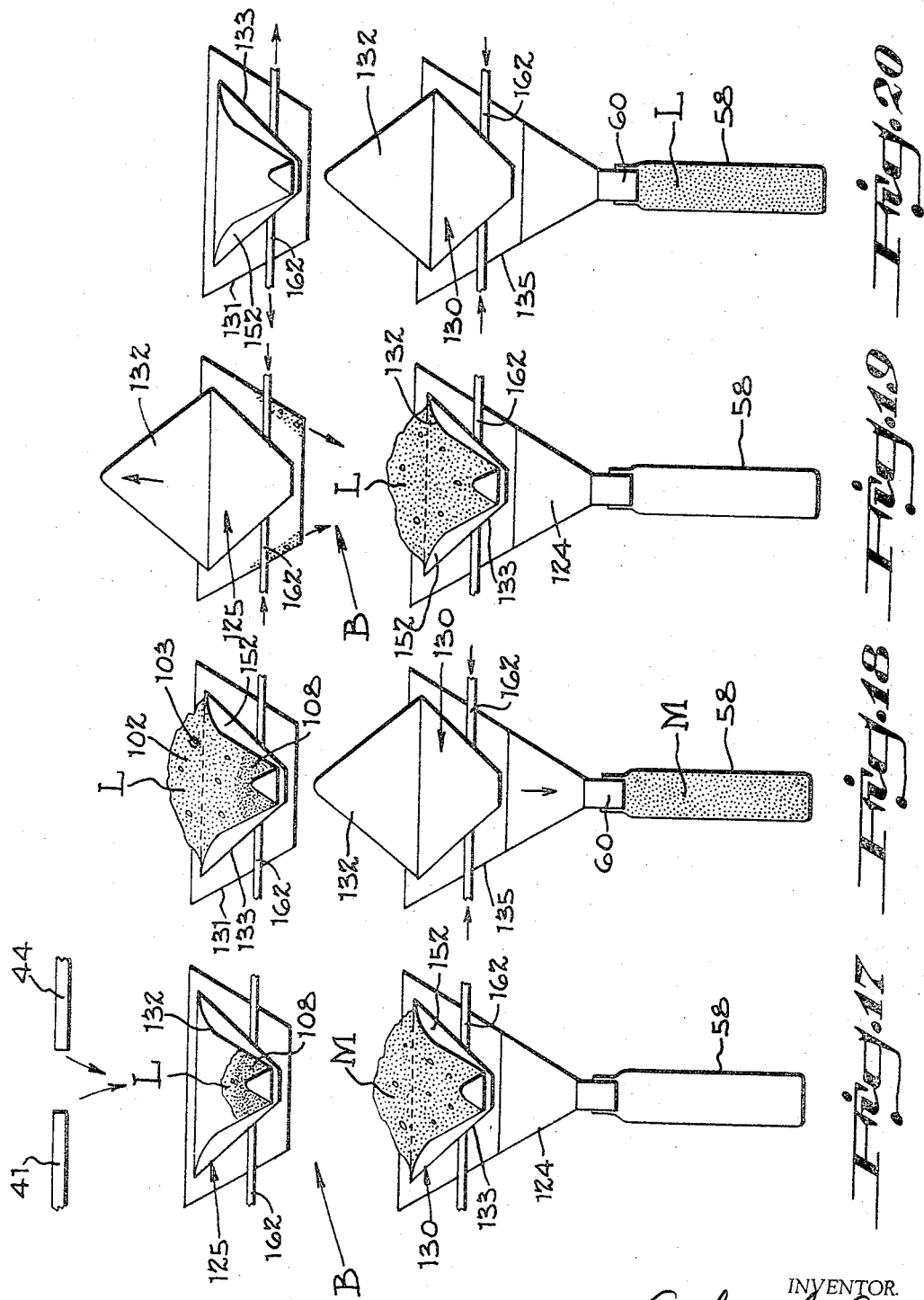

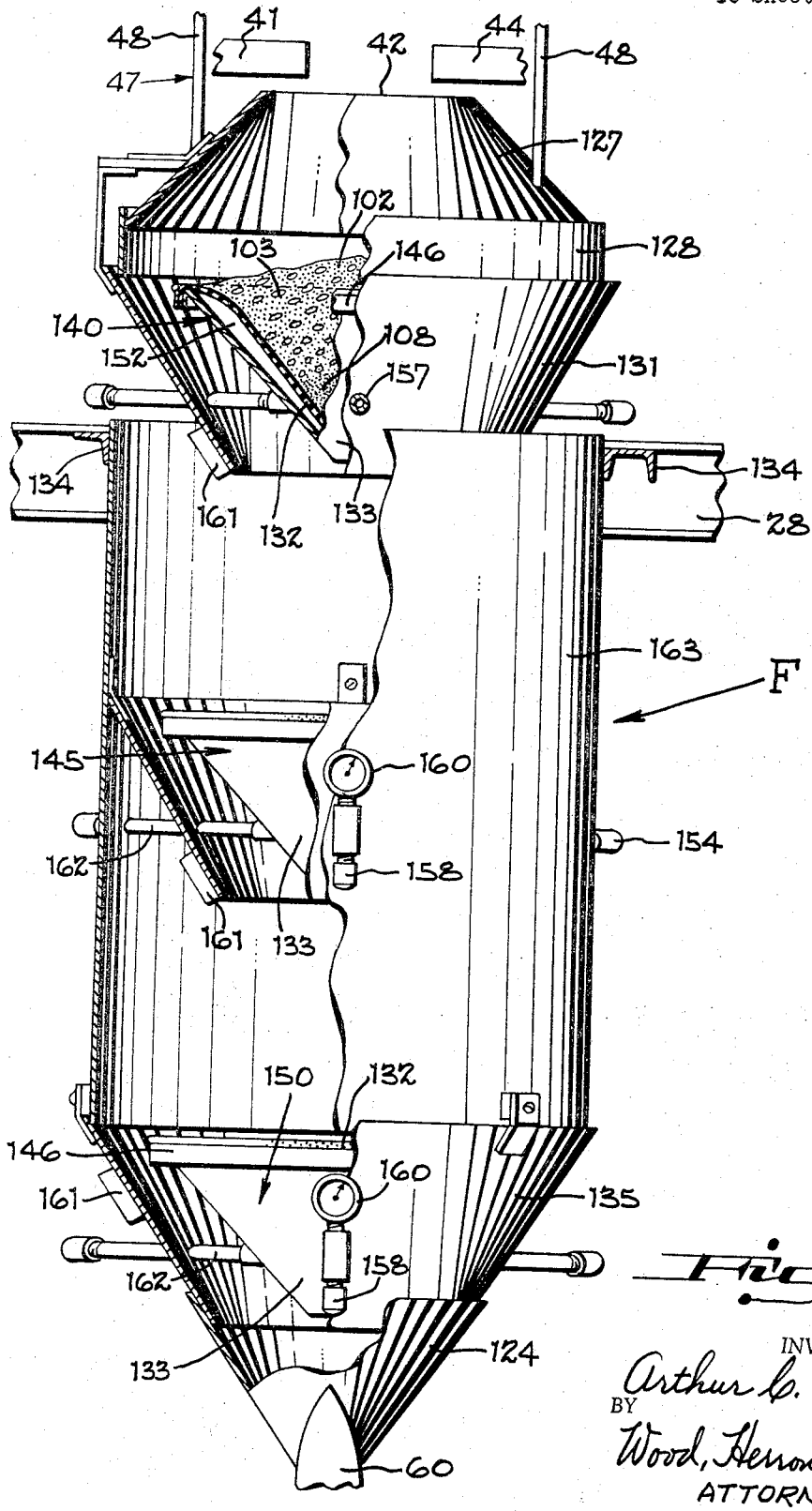

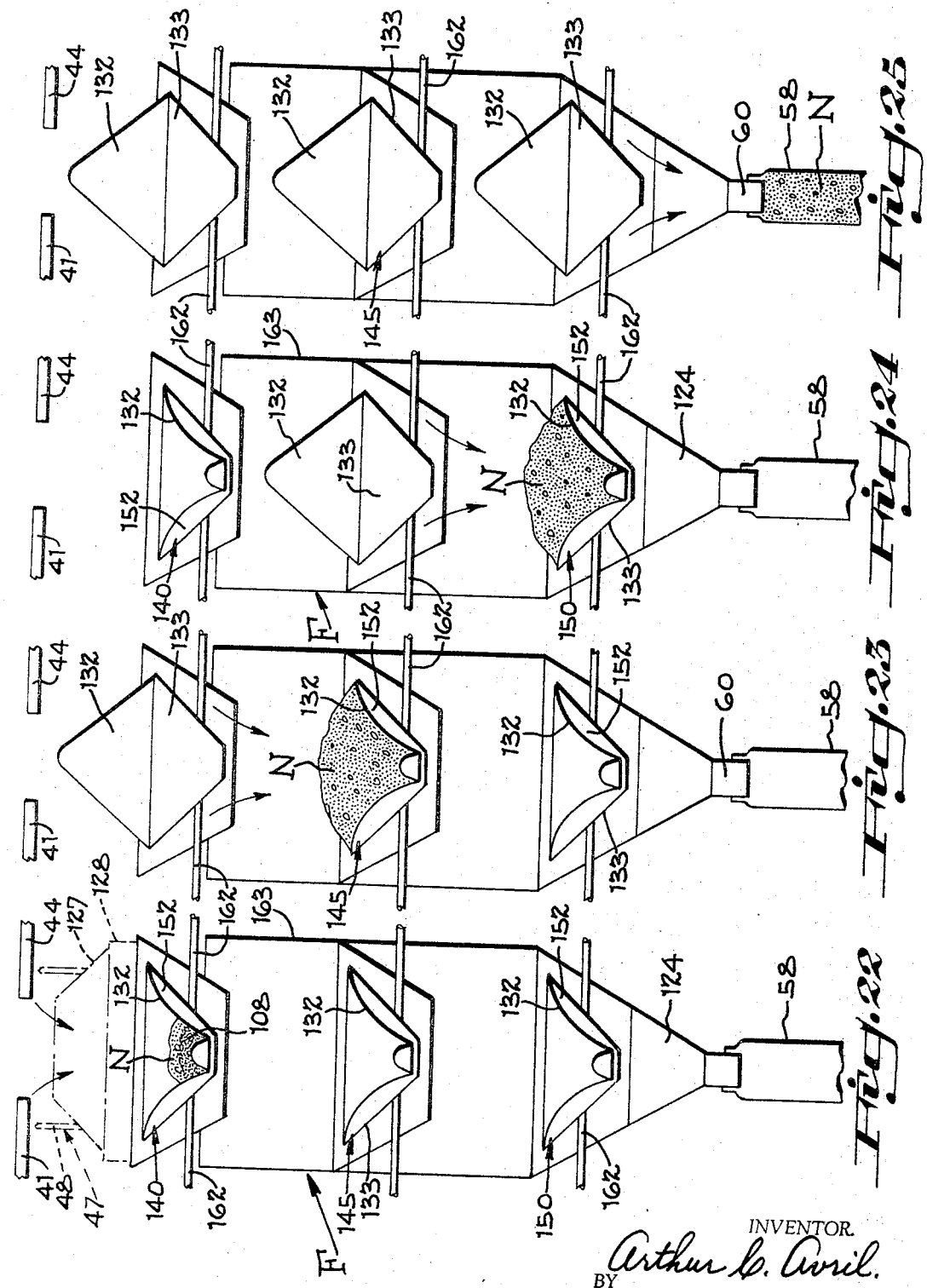

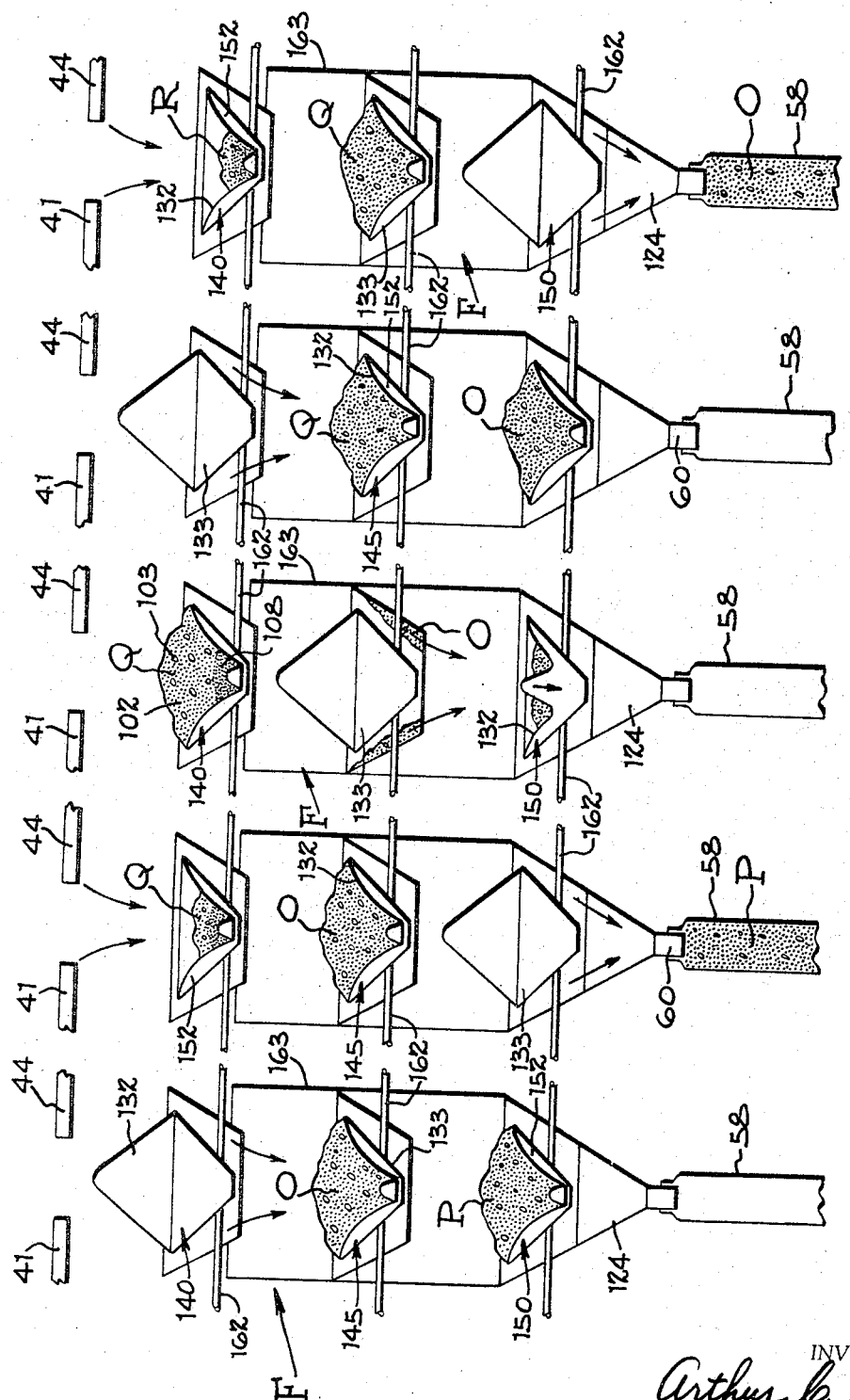

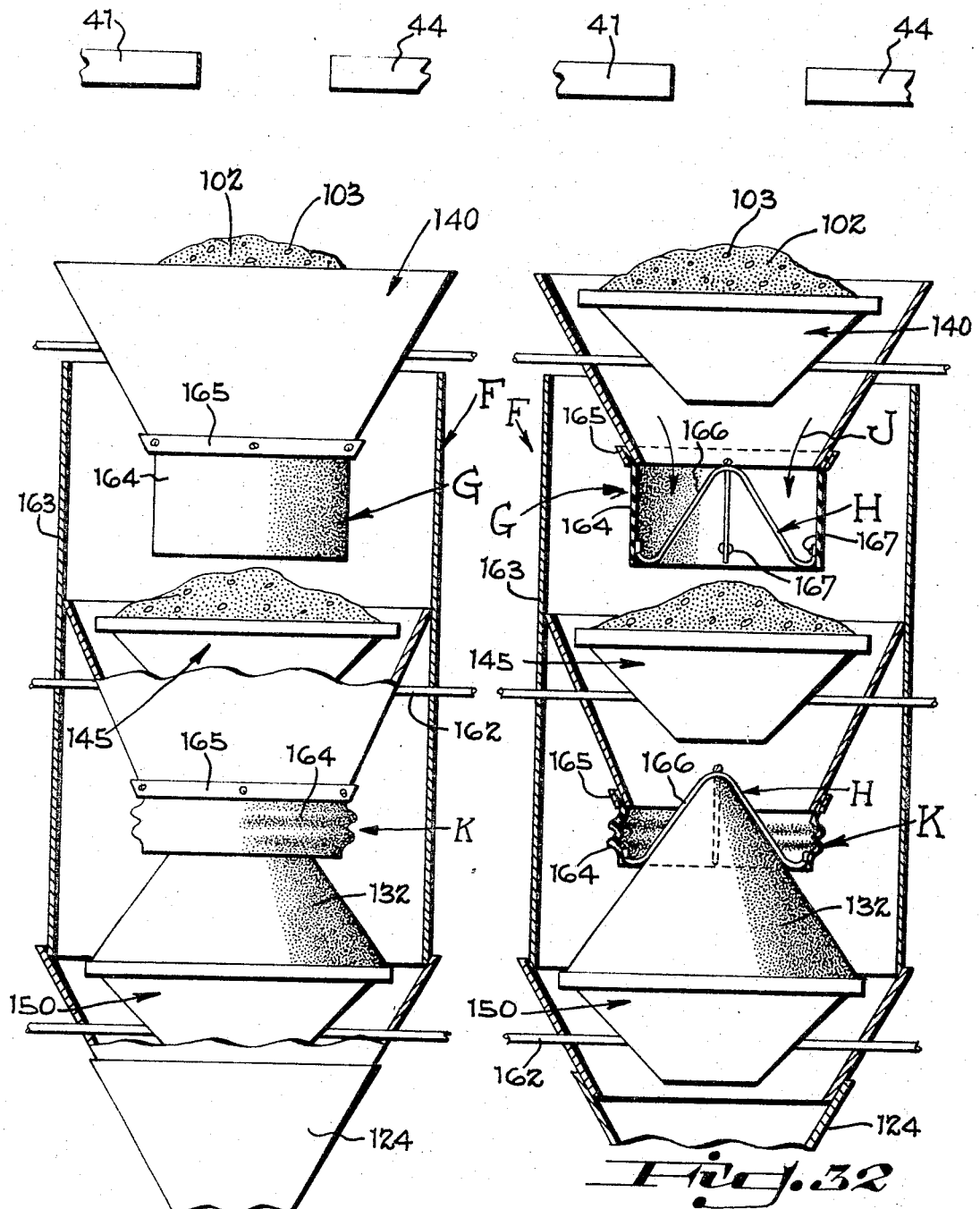

United States Patent Office 3,348,818
Patented Oct. 24, 1967

3,348,818
APPARATUS AND METHOD FOR BLENDING DRY MATERIALS
Arthur C. Avril, Cincinnati, Ohio, assignor to A & T Development Corporation, Cincinnati, Ohio, a corporation of Ohio
Filed Feb. 12, 1965, Ser. No. 432,168
34 Claims. (Cl. 259—148)

This invention relates to the blending of a combination of dry materials, either of uniform or of varying particle sizes and of different specific gravities. The invention is disclosed, as a selected example, in relation to the manufacture of dry packaged concrete, utilizing the heat exchange principle for dehydrating the sand and aggregates, as disclosed in the Avril Patent No. 2,904,942.

The present blending or commingling apparatus is also intended to be incorporated in existing packaging plants disclosed in the earlier Avril Patent No. 2,530,501, thereby to convert existing plants to the use of the present blending apparatus.

As outlined in the heat exchange Avril Patent No. 2,904,942, the dry packaged concrete is used extensively by householders who wish to do small concrete jobs or concrete repair work themselves at minimum expense. The dry packaged concrete is also utilized extensively in small commercial repair jobs which require a limited amount of concrete. To satisfy the market, the Portland cement, sand and aggregate, in dry condition are mixed and packaged, such that the purchaser merely mixes the contents of the package with water and pours it at the job.

The sand and aggregate, usually gravel, normally are in most condition when shipped from the source of supply; however, this presents no problem in preparing ready mixed wet concrete, or in mixing concrete on the job, because water is added during the mixing operation and the mixture is poured immediately thereafter. On the other hand, in the preparation of dry packaged concrete, the sand and gravel must be dryed thoroughly before mixing and packaging, otherwise the mixture will hydrate when the moist ingredients are combined with the Portland cement in the package.

As disclosed in the earlier Avril Patent No. 2,530,501 (direct dehydration of sand and aggregates) the sand and aggregates are mixed together and dehydrated while in a state of agitation, with exposure to a blast flame, so as to drive off all surface moisture and to reduce the absorbed moisture as hereinafter described.

In the plants disclosed in both patents, the predetermined quantities of combined aggregate are screened into three sizes which are fed into a scale hopper and recombined cumulatively in proper weights for a concrete mix designed to exceed 400# p.s.i. 28 day strength. The apparatus cannot be recycled until the operator has discharged the scales into a mixing mechanism and discharged into a bag.

Generally speaking, the heat exchange dehydrating apparatus disclosed in the later Avril Patent No. 2,904,942 (for which the blending apparatus is primarily intended), provides a method of dehydrating sand and aggregate, in which the surface moisture and absorbed moisture are driven from the sand and aggregates at temperatures sufficiently low to preserve the quality of the particles and sufficiently low to allow the particles to be bagged immediately after dehydration and weighing, without damage to the bags. In general, the heat exchange apparatus is arranged to heat raw, damp sand to a temperature in the range of 175 to 375 degrees F. dependent upon its dampness for a period sufficient to dehydrate it. The dehydrated sand is then mixed with the raw aggregate, the ratio being in the neighborhood of 40 to 55 percent aggregate (gravel) and 60 to 45 percent sand. When the dehydrated hot sand is commingled and agitated with the raw gravel or aggregate, the aggregate is dehydrated by heat transfer from the sand, thereby to reduce the mixture of sand and aggregate to a temperature in the range of 130 to 150 degrees F. This permits the sand, aggregate and Portland cement to be combined and dumped immediately into the bag.

One of the primary objectives of the present invention has been to provide a blending or mixing apparatus and process which provides more thorough commingling of the sand, aggregates and cement and which provides more rapid operation of the packaging plant. In other words, the blending apparatus of the invention permits faster cycling of the weighing apparatus of the packaging plant in which it is incorporated and therefore speeds up production.

A further objective has been to provide a blending apparatus of simplified design which is substantially free of moving parts and which therefore provides trouble-free operation and eliminates maintenance throughout the life of the apparatus.

According to this aspect of the invention, the present blending apparatus includes a plurality of flexible, generally cone-shaped diaphragms which are formed of rubber or similar flexible material, adapted to be shifted from a collapsed inverted position to an erected position, as explained later. During the loading cycle, the materials (for example, dehydrated cement, sand and aggregates) are fed into the blending apparatus which preferably is suspended from a weighing apparatus for automatic operation.

In the process of blending, each diaphragm is depressed to the shape of an inverted cone so that it becomes a vessel to contain a mass of material that has been weighed and placed in this vessel. Now to disperse this mass of material the diaphragm is changed from the inverted cone with an apex at the bottom by expanding it rapidly to the form of an erected cone with the apex at the top. The mass of material is thus propelled from the diaphragm as a circular, relatively thin flow stream which is discharged from around the base of the cone in the form of a cascade. This action causes all particles to become intermingled, and in commingling, the fines take up the spaces between the coarse particles, thereby to create a process of blending which provides maximum commingling and compaction to form a mixture, which is, as nearly possible, a perfect blend.

Upon being discharged, the commingled materials impinge against a deflector which is also preferably of inverted cone-shape.

It has been found by experiment, that a multiple stage system of blending is preferable, particularly in blending a dry concerte mix. In other words, when a multiple stage system is used, the material starts to flow and it is actually stopped in each progressive stage in the blending so that all particles can commingle. In order to further refine the blending, it is subjected to a second cycle, a repetitive cycle which does the same thing. On the matter of the materials to be blended there are varying numbers of stages required to do a thorough stage of blending, you may do it with two, three or four stages. In blending dehydrated cement, sand and aggregates (cited as an example) it has been found, that the ideal number of stages is three; after passing through three stages it is almost impossible to determine the composition of blending materials, due to the thorough blending action.

The diaphragms may be shifted from the collapsed inverted loading position to the erected discharge position by any one of several means which provide rapid erection for substantially simultaneous discharge of the ingredients.

By way of example, a mechanical, power-operated device may be connected with the central portion of the cone-shaped diaphragm and arranged to shift the loaded diaphragm rapidly from its collapsed to its erected position for discharge. In place of the mechanical device, a power cylinder, operated by air or hydraulic pressure, may be utilized to actuate the diaphragm.

It has been determined by experiment, that the mechanical and hydraulically operated diaphragms operate successfully; however, these devices require considerable space and increase the head room required for the blending apparatus.

In the embodiment selected to illustrate the principles of the invention, the flexible diaphragm is actuated by means of air pressure, which greatly reduces the head room which would otherwise be required. Briefly, each pneumatically actuated diaphragm is enclosed in a rigid shroud formed of sheet metal which is in the form of an inverted cone, with the outer edge of the flexible diaphragm sealed to the upper edge of the inverted cone-shaped shroud or pressure-vacuum housing. The cone-shaped diaphragm is adapted to be shifted from its collapsed inverted loading position and expanded to its erected discharge position by applying air pressure to the space between the inverted diaphragm and the rigid shroud which surrounds the diaphragm. After discharge of the ingredients, the diaphragm is drawn back to its inverted loading position by applying vacuum to the space between the shroud and diaphragm. The combination of the self-contained cone-shaped flexible diaphragm and the inverted, cone-shaped rigid shroud is referred to hereinafter as a "blending unit," to which air pressure and vacuum is applied to actuate the diaphragm. In the preferred form of the invention, the uppermost blending unit constitutes a scale hopper, the blending unit being suspended from the automatic weighing apparatus of the packaging plant, as explained later in detail.

In this embodiment of the invention, the weighing mechanism feeds the dehydrated sand, aggregate and cement into the upper blending unit (while the diaphragm is in its inverted collapsed position) until the metered amounts of the ingredients are fed in, at which time the feeders for the sand, aggregates and cement are decommissioned in an automatic manner by the weighing apparatus. The mixing and dumping cycle is then initiated by the operator. In the structure disclosed, the several diaphragms are mounted within an upright chamber, the lower end of which is arranged to discharge the blended mixture directly into a bag. A further advantage of utilizing multiple blending units arises from the fact that two or more batches may be acted upon concurrently so as to speed up the loading cycles and also from the fact that more thorough blending is carried out, as noted above, as required by the type of ingredients being blended.

A further objective of the invention has been to provide a blending apparatus, of the type outlined above, which may be incorporated in existing packaging plants in a relatively simple, convenient manner, as well as in newly erected plants, thereby to improve the blending action and to speed up production of the packaged product.

In the embodiment described above, the blending apparatus is intended primarily for use in conjunction with the heat exchange packaging plant as disclosed in Patent No. 2,904,942, in which instance, the upper, self-contained blending unit is suspended as a unit from the automatic weighing apparatus.

A modified form of the blending apparatus is intended to be interchanged with the mixing apparatus disclosed in the earlier Avril Patent No. 2,530,501. In this packaging plant, the dehydrated sand and aggregates are fed into one scale hopper while the dry Portland cement is fed into a second scale hopper. These hoppers are suspended from the weighing apparatus, such that the feeders are automatically deenergized when the predetermined metered quantities of the materials are fed into the scale hoppers.

In this form of the invention, the blending apparatus may comprise two or three blending units (diaphragms and companion shrouds) arranged to receive the material which is discharged from the two hoppers at completion of the weighing cycle. In this instance, the chamber, in which the blending units are mounted, is supported in a fixed position since the weighing operation is carried out by the scale hoppers of the packaging plant.

To summarize, the several forms of the blending apparatus disclosed herein are all based upon the same principle of operation, without respect to the packaging plant in which the apparatus is utilized. Essentially, each blending apparatus comprises an upright chamber in which the several blending units (diaphragm and shroud) are mounted one above the other. The upright chamber preferably is cylindrical in shape, and the blending units, which are mounted within the chamber, are also generally cylindrical but are smaller in diameter to provide an annular space through which the mass of material cascades from about the base of the blending unit in a relatively thin flow stream, as noted above.

Beneath each blending unit there is provided a deflector, preferably formed of sheet metal, which is of inverted cone-shape and which has open upper and lower ends. The upper or large end of the cone-shaped deflector has a diameter equal to the diameter of the chamber in which it is mounted so as to intercept the flow stream cascading from the blending unit as the material is propelled from the erected, cone-shaped diaphragm. The cone-shaped diaphragm intercepts the mass of material propelled from the blending unit above it and directs the material from its lower open end into the blending unit immediately below, in which the diaphragm is inverted to receive the commingled material. The lower end of the chamber also includes a cone-shaped deflector leading to a delivery spout so that the blended material may be discharged directly into the bag.

Commingling or blending of the ingredients of concrete mix is difficult because of the solid granular nature of the constituent materials. Each material has a different range of particle size (fineness) and weight. As a consequence, the materials tend, during conventional mixing, to separate into layers.

The problem may be envisioned as attempting to thoroughly mix small heavy particles, such as lead shot with larger and lighter materials, such as grains, acorns or the like by a tumbling action. It is nearly impossible to obtain a random distribution of the shot throughout the lighter and larger materials in such a way that the shot fills the voids between the lighter materials. This same problem to a lesser degree is encountered with concrete mix; the fine materials tend to separate rather than to fill the voids between the larger granular materials. The fact that this invention has accomplished the objective of better blending the materials is visibly demonstrated by the fact that a bag filled according to the invention of this application with a selected weight of mix is several inches shorter than a bag filled with the same weight mix by prior methods. This is due primarily to the absence of voids in the blended mixture, resulting in greater compaction or density.

The various features and advantages of the invention will be more fully apparent to those skilled in the art from the following detailed disclosure taken in conjunction with the attached drawings.

In the drawings:

FIGURE 5 is an enlarged fragmentary sectional view taken along line 5—5 of FIGURE 3, detailing the discharge end of the lower heat exchange drum, illustrating the separator screen and the surge hopper which stores the gravel and aggregates in separate compartments for subsequent advancement to the scale hoppers.

FIGURE 6 is an enlarged side elevation of a dehydrating and packaging plant generally similar to FIGURE 2, but showing a modified arrangement in which the heat exchange cylinders are mounted in the lower portion of the plant, with conveyor equipment for elevating the dehydrated sand and aggregate to the feeders for advancement to the blending apparatus of the invention.

FIGURE 7 is a longitudinal sectional view of a modified arrangement in which the blending apparatus is rigidly mounted, as distinguished from the structure shown in FIGURES 1–6. In the modified arrangement, the sand and aggregates are fed into one scale hopper while the cement is fed into a second scale hopper, both hoppers being suspended from the scale beam, as disclosed in Avril Patent No. 2,530,501.

Figure 3:
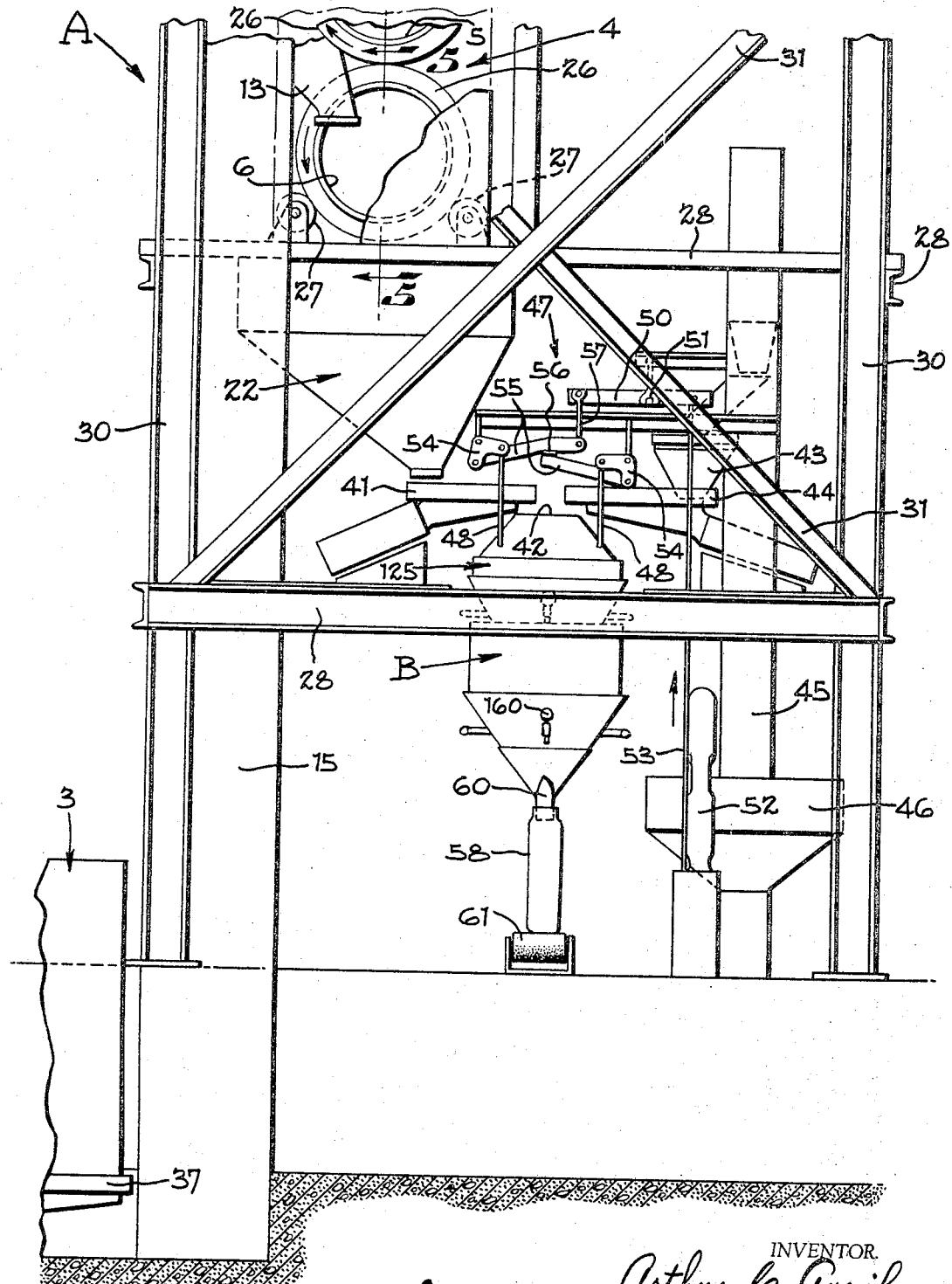
FIGURE 3 is an enlarged fragmentary end elevation of the packaging plant as projected along line 3—3 of FIGURE 2.
Figure 4:
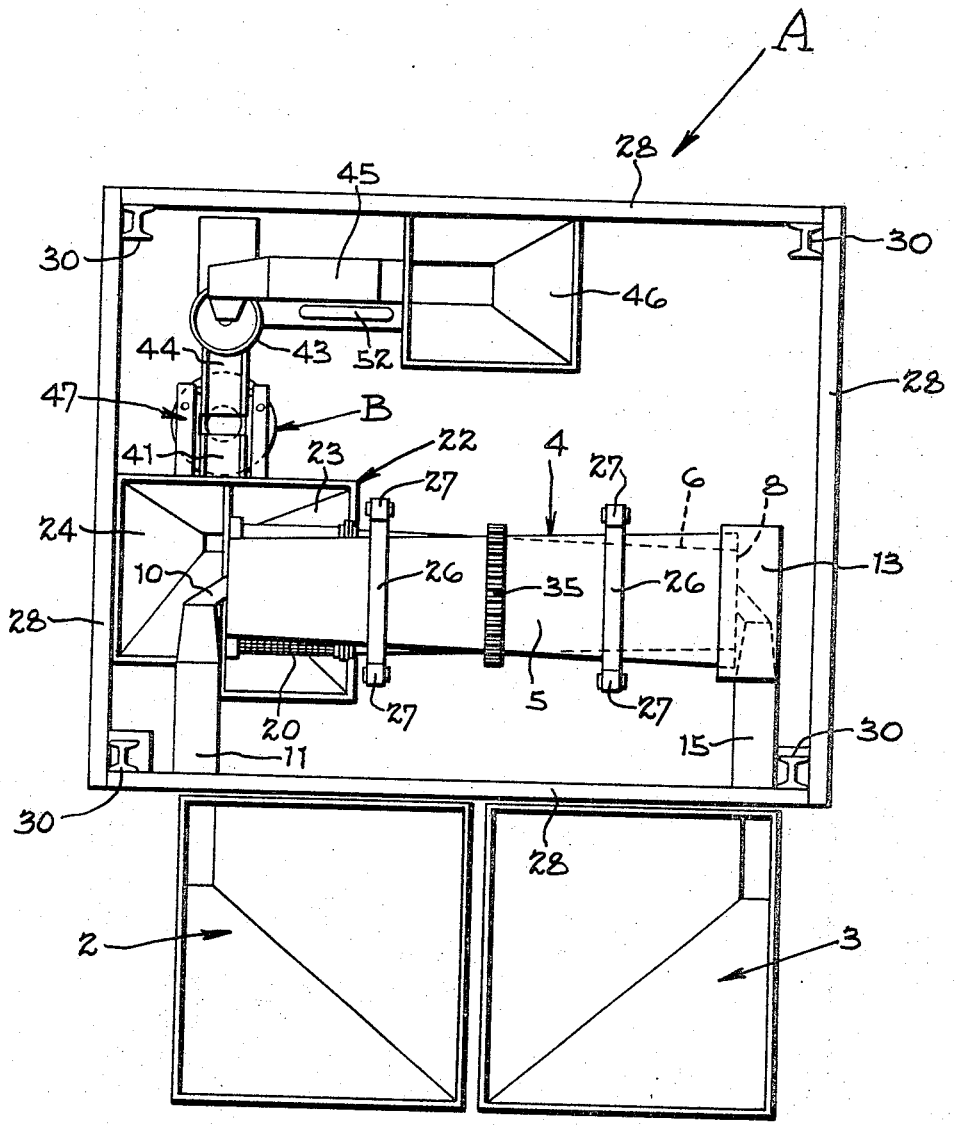
FIGURE 4 is a top plan of the packaging plant as viewed along line 4—4 of FIGURE 2.

FIGURE 8 is an enlarged fragmentary view of the blending apparatus taken from FIGURE 3.

Figure 9:
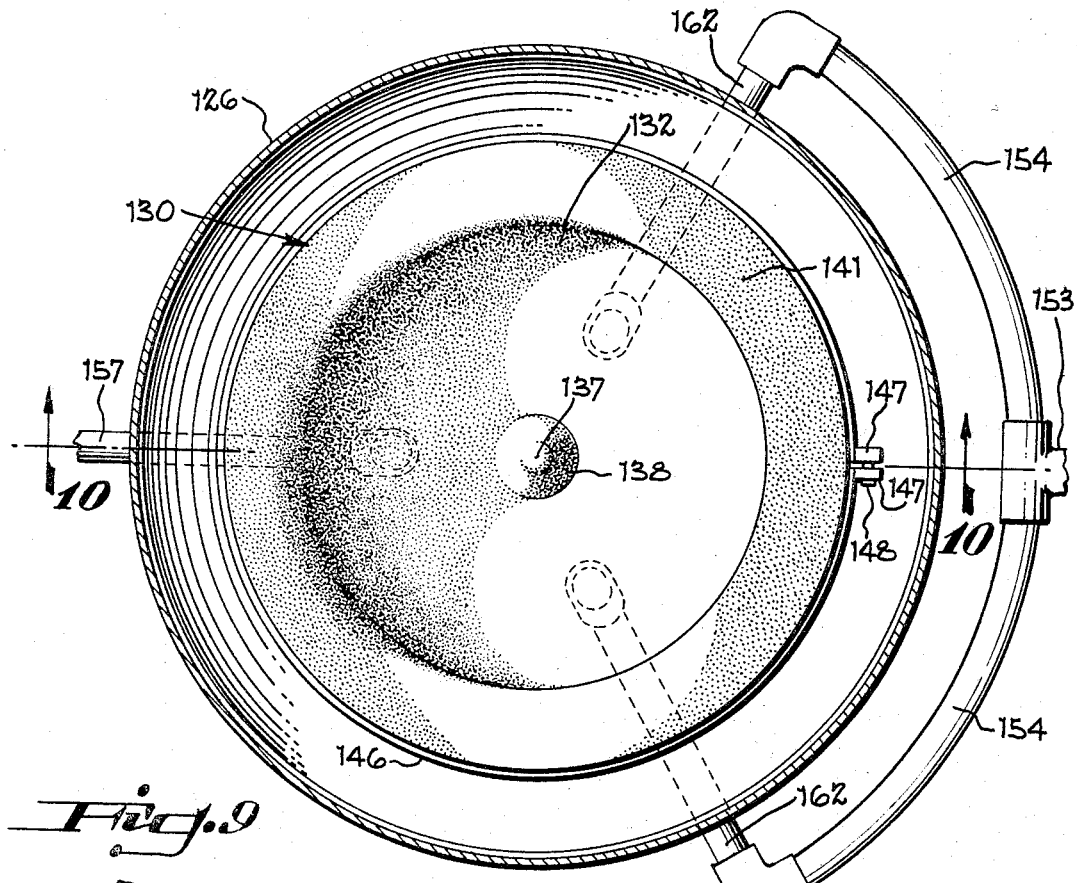

FIGURE 9 is a sectional view taken along line 9—9 of FIGURE 8, illustrating the general arrangement of the double diaphragm pneumatic blending apparatus.

Figure 10:
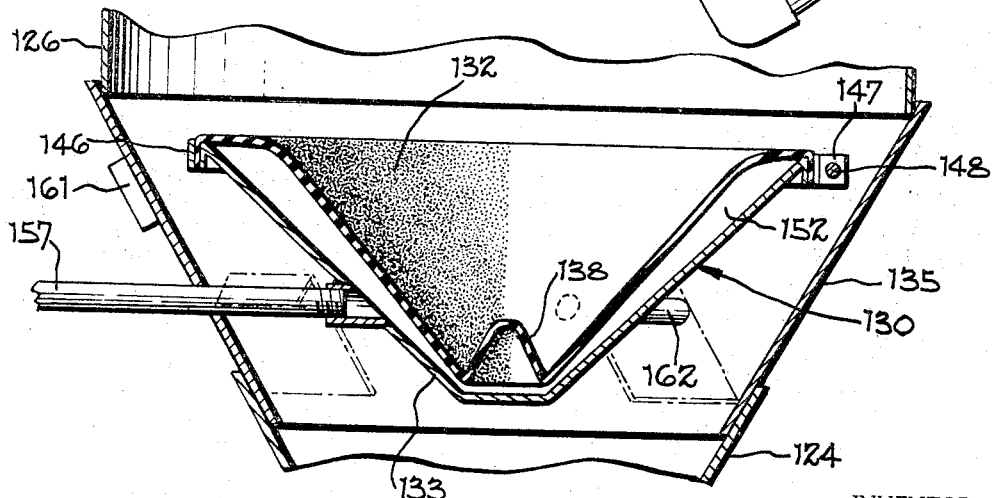

FIGURE 10 is a sectional view taken along line 10—10 of FIGURE 9, further illustrating the blending apparatus, with one of the flexible diaphragms in its collapsed or concave position.

FIGURE 11 is a view similar to FIGURE 10, showing the diaphragm in its erected or convex discharge position.

FIGURE 12 is an enlarged fragmentary view, partially in section, detailing the preferred construction of the diaphragms which are utilized in the blending apparatus.

FIGURE 13 is an enlarged fragmentary sectional view taken from FIGURE 10, detailing the clamping structure which is utilized in mounting the diaphragm within the chamber of the blending apparatus.

Figure 14:
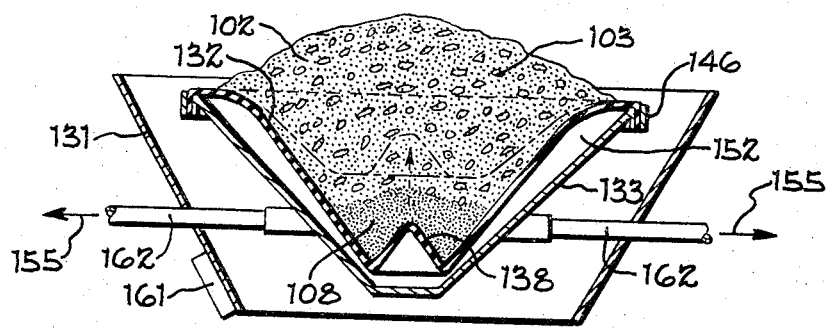
Figure 15:
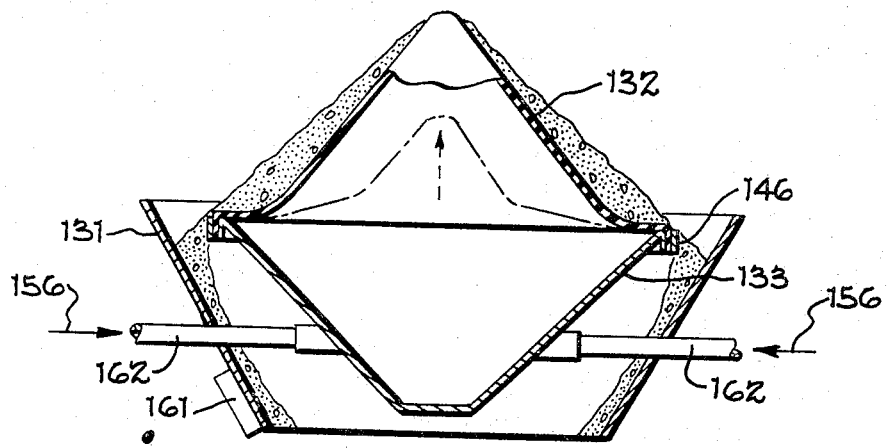
Figure 16:
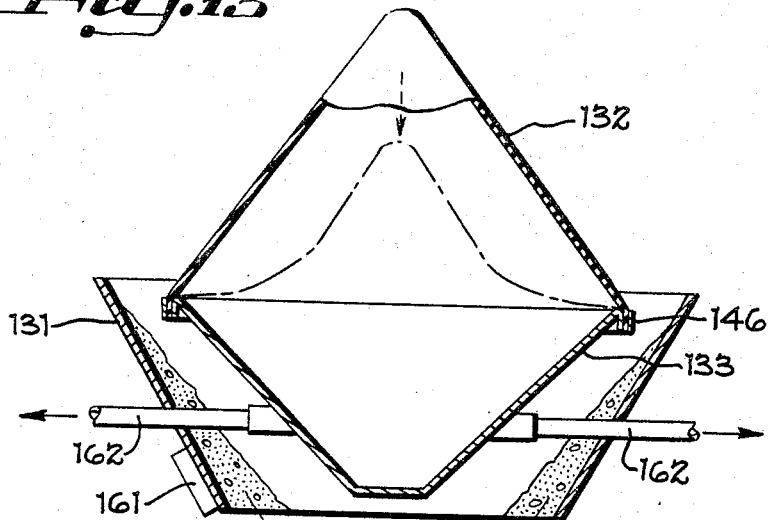

FIGURES 14, 15 and 16 are diagrammatic views illustrating diagrammatically the action of one of the flexible diaphragms, as the diaphragm is progressively inflated from its collapsed to its erected position, with the dry concrete loaded therein, and also showing the blending action of the dry mixture during erection of the diaphragm.

FIGURES 17, 18, 19 and 20 are diagrammatic views showing the progressive steps of loading and bagging the dry concrete mixture in the operation of the double diaphragm blending apparatus shown in FIGURES 1–4 and 6.

FIGURE 21 is an enlarged fragmentary view of the blending apparatus, generally similar to FIGURE 8, but showing a slightly modified arrangement which utilizes three blending diaphragms as distinguished from the double diaphragm structure shown in FIGURE 6.

FIGURES 22, 23, 24 and 25 are simplified diagrammatic views illustrating the operation of the triple diaphragm blending apparatus of FIGURE 21 with reference to a single batch of material to bring out the progressive blending action.

FIGURES 26, 27, 28, 29 and 30 are diagrammatic views similar to FIGURES 22–25 but showing the blending apparatus acting simultaneously upon several batches of dry concrete.

FIGURE 31 is an elevation of a slightly modified triple diaphragm blender which utilizes flexible shrouds to aid in controlling the flow streams of the dry concrete mixture upon erection of the diaphragms.

FIGURE 32 is a view similar to FIGURE 31, showing the apparatus in cross section.

GENERAL DESCRIPTION OF THE SEVERAL FORMS OF THE INVENTION

*(Heat exchange packaging plant)*

In the form of the invention disclosed in FIGURES 1–5, there is disclosed a packaging plant for dehydrating and bagging batches of dry Portland cement and dehydrated sand and gravel (Avril Patent No. 2,904,942, issued on Sept. 22, 1959). The plant disclosed in this embodiment of the invention is indicated generally at A. The heat exchange packaging plant (FIGURES 1–5), is described in detail later.

The reference numerals referring to the components, as indicated in the several brief descriptions, are those used later in the detailed sections of the specification, which follows.

Generally speaking, the raw sand and raw aggregates are dehydrated during passage through a pair of heat exchange drums 5 and 6, then the sand and aggregates are separated and are fed from surge hoppers by means of a feeder 41 to the blending apparatus B of the present invention. The dry Portland cement is fed into the blending apparatus B (double diaphragm) by operation of a cement feeder, which is indicated at 44 in FIGURE 1. The double diaphragm blending apparatus B is described later in detail with reference to FIGURES 1 to 4 and 8.

As described later in detail, the double diaphragm blending apparatus B (FIGURES 3 and 4) is suspended from a weighing mechanism 47, which determines the proper proportions of dry Portland cement and dehydrated sand and aggregates. The weighing mechanism 47 is arranged to shut down the Portland cement feeder 44 and the sand and aggregate feeder 41 in response to the weight load of the ingredients which are charged into the blending apparatus B. After the ingredients are charged in, the dumping operation is initiated by the operator, causing the ingredients to be thoroughly intermixed and delivered into a bag.

*Modified dehydrating and packaging plant*

The packaging plant C, disclosed generally in FIGURE 6, is similar in principle to the plant A disclosed in FIGURES 1–4. The plant C differs from plant A in that the heat exchange drum 65 is mounted in the lower portion of the plant, as explained later in detail. In this embodiment of the invention, the dehydrated sand and aggregates issuing from the heat exchange drum 65 are separated from one another and fed into a surge hopper 85 having separate compartments, as described in detail later with reference to FIGURE 6.

From the surge hopper 85, the dehydrated sand and aggregates are lifted by an elevator 87 to a sand and aggregate hopper 91 which includes a vibratory feeder 41 which advances the proper proportions of dehydrated sand and gravel to the double diaphragm blending apparatus, previously indicated generally at B, which is similar to the blending apparatus B shown in FIGURES 1–4. A second vibratory feeder 44 (not shown, but indicated by broken lines) advances dry Portland cement into the blending apparatus B. In this example, the blending apparatus B is also suspended from a weighing mechanism 47, which is arranged to control the operation of the cement and sand and aggregate feeders when the proper proportions of materials (by weight) are fed into the blending apparatus B.

*Second modified packaging plant*

The packaging plant disclosed generally in FIGURE 7 discloses an arrangement for incorporating the modified blending apparatus D in the present invention in a modified packaging plant indicated generally at E. The plant E is illustrated in detail in the prior Avril Patent No. 2,530,-501, which was issued on Nov. 21, 1950. In this arrangement, the dehydrated sand and aggregates are charged into one scale hopper 100 and the dry Portland cement is charged into a second scale hopper 105. The two hoppers are suspended from respective scale beams 101 and 107 which, in turn, are interconnected with a control system (not shown) which regulates the operation of the vibratory feeder 104 for the dehydrated sand and aggregates and the vibratory feeder 106 for the dry Portland cement.

When the predetermined quantity (by weight) of sand and aggregates and of Portland cement are fed into the two scale hoppers, the feeders are shut down by the control system in response to the scale hopper. The ingredients are then discharged from the two scale hoppers into the modified blending apparatus D. Since the ingredients are weighed in advance in the two scale hoppers 100 and 105, which are suspended from the scale beams 101 and 107, the blending apparatus D is mounted in a fixed position. This arrangement thus makes it possible to convert the prior packaging plant (Patent No. 2,530,501) to the modified pneumatically-operated blending apparatus D of the present invention.

Double diaphragm blending apparatus

In the several views of the drawings referred to above (FIGURES 1–4 and 8) the blending apparatus B is of the double diaphragm type, as indicated previously, having two blending units, indicated generally at 125 and 130. The double diaphragm blending apparatus B, generally speaking is suspended, at least in part, from the weighing apparatus, such that the metered quantities of dehydrated sand, aggregates and dry Portland cement are fed directly into the charging end of the blending apparatus B. As noted above, the weighing apparatus decommissions the vibratory feeders for the sand, aggregates and cement in response to the weight load of these materials as they are loaded into the blending apparatus B. The cement preferably is fed into the charging end of the blender B first; when the predetermined weight load of cement is charged in, the cement feeder 44 is decommissioned and the sand and aggregate feeder 41 is energized. When the proper proportions of sand and aggregates are fed into the charging end of the blending apparatus B, then the weighing apparatus decommissions the second feeder, such that the ingredients may be discharged through the blending apparatus B, intermixed and packaged. The blending and dumping operation is initiated by the operator after the weighing operation is completed.

The structural details of the double diaphragm blending apparatus B are disclosed in FIGURES 9–16. The operating cycles of the two diaphragms in sequentially blending and dumping the ingredients are disclosed in FIGURES 17–20.

Triple diaphragm blending apparatus
(FIRST MODIFICATION)

The blending apparatus indicated at F (FIGURES 21–30) illustrates a modified arrangement in which the blending apparatus is provided with three pneumatically operated blending units, indicated generally at 140, 145 and 150. As best shown in FIGURE 21, upper blending unit 140 of blending apparatus F is suspended from the weighing apparatus, similar to the blending unit 125 of the double diaphragm apparatus, previously indicated at B. The principle of operation is similar to that described with reference to the double diaphragm arrangement B. Thus the proportions of dehydrated sand and aggregates and dry Portland cement are charged by operation of respective feeders 41 and 44 into the upper blending unit 140, which is suspended from the links or hangers 48 of the weighing apparatus 47. When the proper proportions are charged into the upper blending unit, or charging section 140, the ingredients are discharged by operation of the pneumatically-operated diaphragm of the blending unit 140 and sequentially advanced by gravity through the remaining two pneumatically-operated blending units 145 and 150 to be loaded into the bag. The operation of the triple diaphragm blending apparatus F is illustrated diagrammatically in FIGURES 22–30.

Shrouded diaphragm arrangement
(SECOND MODIFICATION)

The modification as shown in FIGURES 31 and 32 represents a triple diaphragm blending apparatus. In the modified structure, there is provided a flexible skirt, indicated generally at G, depending downwardly from the lower end of each blending unit 140, 145 and 150. Each flexible skirt G is formed of rubber or a similar flexible material and includes a wire framework, which is generally cone-shaped, as indicated at H.

The purpose of the skirts G is to control the flow of the ingredients as they are discharged successively from one blending unit (flexible diaphragm) to the next, and also to control the dust which may be created when the dry Portland cement is discharged from the successive units 140, 145 and 150.

Thus, as shown in FIGURE 32 the ingredients from the upper unit 140 flow by way of the arrows, as indicated at J, to the next unit 145. As the units are successively shifted to their discharge positions, the upper portion of each diaphragm is projected upwardly into the lower portion of the flexible shroud G above it. Thus, as shown in FIGURE 32, the upper portion of the erected, cone-shaped diaphragm engages the wire spider H, thus compressing the flexible shroud G as, indicated at K (FIGURE 32).

Control system

As noted above, the weighing and discharging operations are controlled by the operator with the use of push buttons. Generally speaking, the operator depresses a push button, which initiates the weighing operation, whereby the dehydrated sand, aggregates and dry Portland cement are charged into the upper blending unit 125 or 140 (apparatus B or F–double or triple diaphragm apparatus). In the case of the apparatus D (FIGURE 7) the materials are charged into the two scale hoppers 100 and 105, as explained above. When the materials, in proper proportion, have been fed into the apparatus, the control system (not shown) provides a signal, such as a light, to indicate the apparatus is ready for the packaging operation. The operator then depresses the button which initiates the dumping operation.

The pneumatic operation of the diaphragms (whether the double or triple diaphragm apparatus) is electrically controlled by the circuit which is in connection with the weighing and dumping buttons or switches. By providing manual operation, the operator is given the opportunity to place a bag upon the lower discharge end of the blending apparatus before closing the dump or bagging switch, such that the materials are delivered directly into the bag from the blending apparatus.

Packaging machine generally

The dehydrating and packing machine shown in FIGURES 1–4 is of the heat exchange type as disclosed in the Avril Patent No. 2,904,942 and has been selected as one example to illustrate the principles of the pneumatic double diaphragm blending apparatus B (blending units 125 and 130) of the present invention (FIGURE 8). It will be understood however, that the blending apparatus may be utilized in conjunction with packaging machines of various types. By way of example, the blending apparatus may be installed as a component part in the heat exchange dehydration and packaging plant as disclosed in FIGURE 6, as noted earlier, which is a modified version of the machine shown in FIGURES 1–4. As another example, the blending apparatus (apparatus D) may be utilized in conjunction with an earlier type of packaging machine, as disclosed in the Avril Patent No. 2,530,501, also noted earlier.

Described generally, the packaging machine disclosed in FIGURES 1–4 continuously dehydrates sand and gravel or other aggregates through a heat exchange principle, coordinated with continuous packaging of the dehydrated materials mixed with dry Portland cement in measured proportions. In general, as noted above, the packaging plant A (FIGURES 1–4) operates through successive weighing cycles, automatically weighing the dry Portland cement, dehydrated sand, and dehydrated aggregates, such as gravel, so as to create a batch of dry concrete upon each cycle of operation. During each weighing cycle, the materials are fed into the pneumatically-operated blending apparatus of this invention, which is indicated generally at B.

It will be understood at this point that the present blending apparatus may utilize one, two, three or more blending units which are generally cone-shaped and which are pneumatically-operated causing the diaphragm to assume, when collapsed, the position of an inverted cone for loading or, when inflated, an erected cone-shaped load discharge position. In the inverted or collapsed position of the diaphragm, the sand, gravel and cement are charged into the inverted diaphragm, with the several ingredients relatively segregated. During the blending cycle, the uppermost or loaded blending unit is inflated by air pressure to its erected position, causing the ingredients to be progressively discharged as the diaphragm is shifted from its inverted to its erected upright cone-shape, as explained in detail later.

The sequential inversion and erection of the cone-shaped diaphragms in relation to the double diaphragm blending apparatus B, is shown diagrammatically in FIGURES 17–20.

The triple diaphragm blending apparatus F, as noted earlier, provides a third blending diaphragm or blending unit as shown in FIGURES 26–30. It will be understood, at this point, that the double diaphragm and triple diaphragm blenders both utilize the same principle of operation, as explained later in detail.

The blending apparatus B, in the present example, is suspended from a weighing apparatus which is arranged to regulate the proportions of the ingredients by weight, as explained earlier. After the predetermined weight load of ingredients (dry Portland cement, dehydrated sand and dehydrated aggregates) are commingled with one another by operation of the pneumatic blending apparatus B, (FIGURES 1–4) then the mixed batch of ingredients is discharged from the blending apparatus directly into a bag.

In the heat exchange packaging machine (FIGURES 1–5), the dehydrated sand and gravel (aggregates) advance from the heat exchanger, through a metering and feeding apparatus into the blending apparatus and bag while still warm.

The bag is made from heavy paper and is lined with moisture resistant material to prevent absorption of atmospheric moisture by the dry concrete mixture within it. After the batch is dumped into the bag, the bag is closed and sealed, preferably by a stitching operation, and in this condition, is ready for marketing or for warehousing. As a typical example, each batch may consist of approximately 14 pounds of Portland cement, 30 pounds of sand and 46 pounds of gravel, these ingredients being premixed and packaged in a 90 pound bag.

In the apparatus shown in FIGURES 1–4, raw sand and gravel are transported from a source of supply and are fed directly into the storage hoppers of the packaging plant for continuous dehydration and treatment. The storage hopper for the raw sand is indicated generally at 2 and the hopper for the raw gravel (aggregates) is indicated at 3. From the storage hopper 2, the sand is conveyed in a metered stream to a first drum of the heat exchange dehydrating mechanism indicated generally at 4. At the same time, the raw gravel is also conveyed upwardly from the raw gravel hopper 3 to the heat exchanger 4.

Upon entering the first drum, which comprises a sand heating drum 5, the sand is heated and dehydrated, after which it is commingled with the stream of unheated raw gravel advancing through the second or heat exchange drum, indicated at 6. The sand and aggregates, in passing through the heat exchange drum 6, are agitated and commingled, such that the hot sand drives off the surface moisture and most of the absorbed moisture from the gravel particles by heat exchange. Moreover, the heat exchange principle reduces the temperature to a point which permits the dehydrated mixture to be bagged immediately after being dehydrated but while still warm, thereby to prevent reabsorption of atmospheric moisture before bagging. In the operation of the dehydrating machine, the ratio of sand to aggregate, which is commingled and advanced through the heat exchange drum amounts to 40 to 55 percent aggregate and 60 to 45 percent sand.

During the heat exchange operation, the raw, damp sand is heated to a temperature in the neighborhood of 175 to 375 degrees F. for a period sufficient to dehydrate the sand, which advances continuously through the sand heating drum 5. The dehydrated sand is then discharged from the sand heating drum into the heat exchange drum 6, such that the aggregate is dehydrated by heat transfer from the sand while being agitated and advanced through the heat exchange drum toward the blending apparatus B. Upon discharge from the heat exchange drum, the mixture is reduced to a temperature substantially in the range of 130 to 170 degrees F. At this temperature, the material may be packaged without injury to the fibers of the paper bags in which it is loaded.

Briefly therefore, the heat exchange principle provides continuous treatment of the sand and aggregate at controlled proportions and temperatures and allows the rate of sand and aggregate treatment to be coordinated with the production rate of the packaging equipment. The quality of the gravel is preserved because the temperature is held below the critical point and is raised gradually while the temperature of the sand is progressively lowered so as to permit the mixture to be bagged as soon as it is discharged from the heat exchange mechanism 4 to the blending apparatus B.

Figure 2:
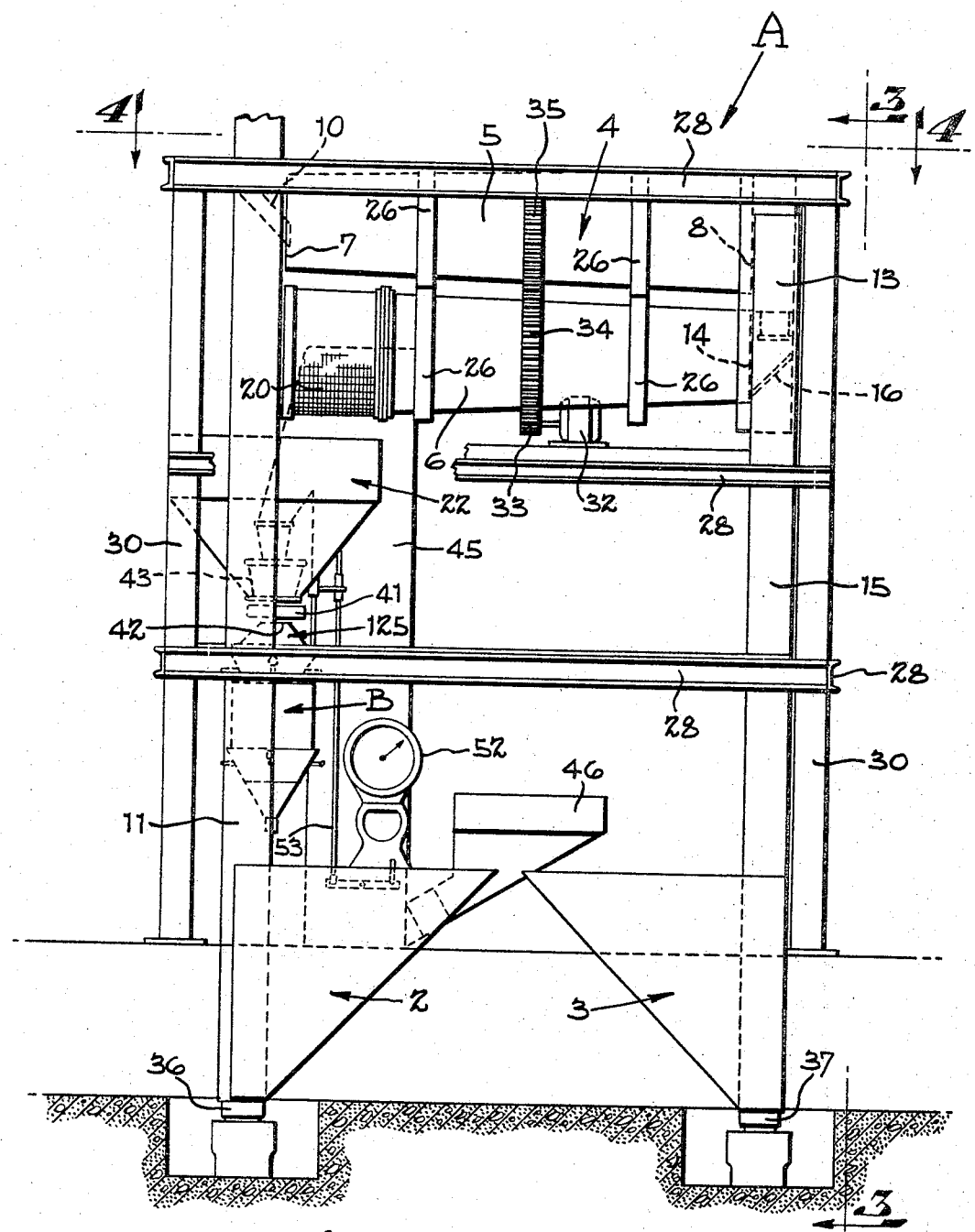
FIGURE 2 is a side elevation of the packaging plant of FIGURE 1, also utilizing the present blending apparatus.

As best shown in FIGURE 2, the sand heating drum 5 and the heat exchange drum 6 are located upon parallel horizontal axes of rotation, and the drums or cylinders are tapered longitudinally. Thus, the sand heating drum has a diameter which increases from its charging end 7 to its discharge end 8. The heat exchange drum 6 tapers longitudinally in a direction opposite to the taper of the sand drum, the taper of the two drums preferably being equal. The taper of the rotating drums creates a gravity flow of material longitudinally, the rate of flow being governed by the speed of rotation of the tapered drums.

Figure 1:
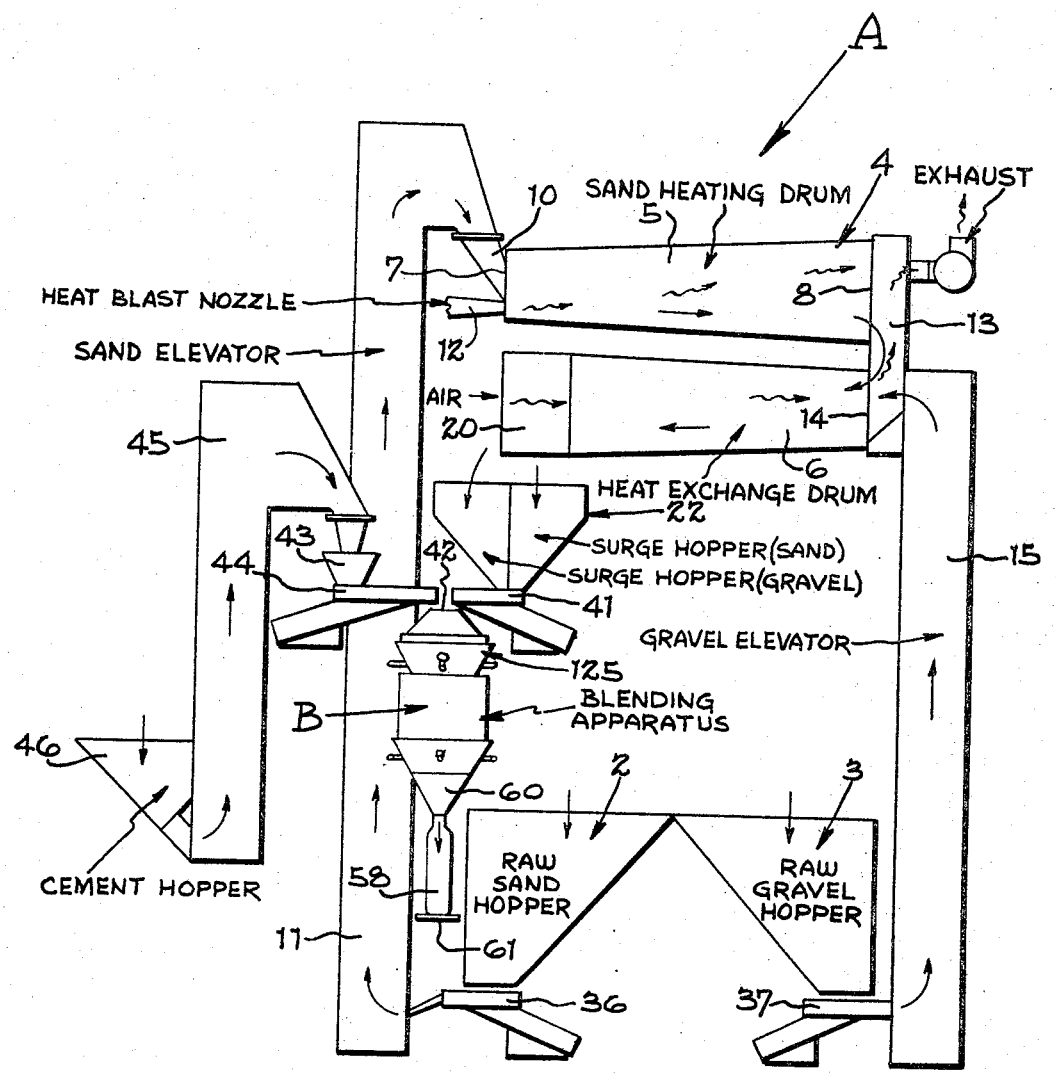
FIGURE 1 is a diagrammatic view of a dry concrete dehydrating and packaging plant of the type disclosed in Patent No. 2,904,942, utilizing the blending apparatus of the present invention at the bagging stage.

The sand is fed continuously into the charging end of the sand drum 5 by a spout 10 which extends downwardly from the sand elevator 11 (FIGURES 1 and 2). Also extending into the charging end 7 is a heat blast nozzle 12 (FIGURE 1) which projects a blast flame longitudinally to the sand drum 5. During passage of the sand through the drum 5, the sand is agitated for uniform exposure to the blast flame. Upon reaching the discharge end 8, the hot sand flows into a collector housing 13 which encloses an end portion on both drums. The collector housing 13 is arranged to transfer the heated sand from the discharge end 8 of the sand drum 5 to the charging end 14 of the heat exchange drum 6.

A continuous stream of raw gravel is fed into the collector housing 13 by means of a gravel elevator 15 (FIGURES 1 and 2) which communicates with the gravel hopper 3. For this purpose, the collector housing 13 includes a gravel deflector 16 (FIGURE 2) which directs the raw gravel into the charging end 14 of the heat exchange drum 6. The hot dehydrated sand, issuing from the sand heating drum 5, also is directed into the charging end 14 by the deflector plate 16 such that the flowing streams of sand and gravel enter the charging end concurrently to be commingled within the rotating heat exchange drum 6.

As indicated in FIGURE 5, the heat exchanger drum 6 is provided with longitudinal vanes 17 which are arranged to agitate the mixture of sand and aggregate during passage through the drum. The sand heating drum 5 is provided with similar vanes (not shown) to provide agitation.

In order to separate the dehydrated sand from the aggregate at the discharge end 18 of the heat exchange drum (FIGURE 5), there is provided a cylindrical separator screen 20 which is attached to the discharge end of the heat exchange drum. In passing into the separator screen, the mixture (sand and aggregate) is agitated causing the sand 21 (FIGURE 5) to pass through the screen into a surge hopper 22 having a compartment 23 to receive the sand. The surge hopper includes a second compartment 24 to receive the gravel (aggregate) 25 which drops from the end of the screen 20. As explained later, the sand and gravel are fed from the surge hopper 22 in predetermined proportions and are discharged directly into the blending apparatus B for immediate blending and bagging.

As best shown in FIGURES 2 and 3, the drums 5 and 6 of the heat exchange mechanism are each provided with pairs of circular bands 26 which track upon one another. The bands of the heat exchange drum 6 are cradled between pairs of rollers 27—27 (FIGURE 3) to stabilize the drum, while the bands 26 of the sand heating drum are cradled between a similar pair of rollers (not shown).

The pairs of rollers 27 are journalled in brackets which are secured to horizontal beams 28 (FIGURE 3). The beams 28 form a part of a structural steel framework including uprights 30 stiffened by cross braces 31 (FIGURE 3).

The sand heating drum 5 and the heat exchange drum 6 are rotated in the direction indicated by the arrows (FIGURE 3) by operation of a motor 32 (FIGURES 2 and 5) having a pinion 33 meshing with a ring gear 34 encircling the heat exchange drum 6. The sand heating drum 5 is rotated in the opposite direction by means of a ring gear 35 encircling the sand heating drum 5 and meshing with the ring gear 34 of the sand heating drum 5.

During the dehydrating operation, the sand heating drum 5 and the heat exchange drum 6 are rotated continuously by the motor 32, while the streams of sand and gravel are fed continuously through rotating drums 5 and 6 by the spout 10 and gravel deflector 16 (FIGURE 2). The rotating sand heating drum 5 and heat exchange drum 6 thereby create a continuous stream of dehydrated sand and gravel at respective rates of flow which are proportioned to the respective quantities of sand and gravel subsequently proportioned to the requirements of the pre-mixed dry concrete.

The final proportioning of the sand and gravel is carried out by means of adjustable gates which control the quantity of sand and gravel flowing from the sand compartment 23 and the gravel compartment 24 of surge hopper 22 (FIGURE 5). The surge hopper provides temporary storage of the hot dehydrated sand and gravel to compensate for temporary fluctuations in the rate of packaging. The proportions of sand and gravel issuing from the sand compartment 23 and gravel compartment 24 of the surge hopper 22 are controlled by means of adjustable gates, as described below.

The supply of raw sand and raw gravel is fed from the raw sand hopper 2 (FIGURES 1 and 2) by an electrically-operated vibrating feeder 36 located below the discharge opening of hopper 2. The vibrating feeder 36 advances the sand 21 to the sand elevator 11 to be fed into the charging end 7 of the sand heating drum 5. Means are provided for controlling the rate of operation of the vibrating sand feeder 36.

The gravel 25 is advanced from the raw gravel hopper 3 to the gravel elevator 15 by a vibrating feeder 37 (FIGURES 1 and 2). The gravel feeder 37 is of the vibratory type similar to the feeder 36 and also includes means for regulating the rate of gravel flow.

The regulated rate of operation of the sand feeder 36 and of the gravel feeder 37 determines primarily the proportion of sand and gravel which ultimately is packaged.

After the raw sand and gravel are advanced through the heat exchange apparatus 4, the sand and gravel are separated and fed into the compartments 23 and 24 of the surge hopper 22 (FIGURE 5), as explained earlier. The surge hopper 22 acts as a final metering station for the sand and gravel, the flow of the two materials being controlled precisely by the adjustable gates 38 and 40 for the sand and gravel respectively.

From the compartments 23 and 24 of the surge hopper 22, the metered streams of sand and gravel are advanced together by a vibrating feeder 41 (FIGURE 5) to the open charging end 42 of blending unit 125 (blending apparatus B—FIGURES 1 and 3) of the present invention. The vibrating feeder 41 is similar to the raw sand and gravel feeders 36 and 37 and the rate of operation may also be controlled to provide the proper proportion of sand and gravel.

In the present example (FIGURES 1 and 3) the upper blending unit 125 of the blending apparatus B is suspended from the scale mechanism which determines the proper proportion of sand and gravel by weight. The scale mechanism is adapted to shut down the vibrating sand and gravel feeder 41 when the correct proportion of sand and gravel has been advanced to the blending apparatus, as explained below.

During the weighing cycle, the dry, measured quantity of Portland cement is also fed into the charging end 42 of blending unit 125 (apparatus B). In the preferred arrangement, the dry cement is weighed in advance of the batch of gravel and sand in order to provide more precise weighing and also to improve the mixing action (FIGURE 8).

The dry cement is fed to the upper blending unit 125 (which acts as a scale hopper, as noted above) from a cement surge hopper 43 which includes a vibrating feeder 44 leading to the charging end 42 of the blending unit 125 (FIGURE 3). The cement is advanced to the surge hopper 43 by means of a cement elevator 45 which withdraws the cement from a dry cement hopper 46 and elevates the cement to the surge hopper 43. The vibrating cement feeder 44 also is adjustable in order to control the rate at which the cement is fed into the blending apparatus B during the weighing cycle.

After the predetermined quantity of cement is advanced to the charging end 42 of the blending unit 125, the cement feeder 44 is decommissioned automatically by the scale mechanism 47 (FIGURE 3). Thereafter, the sand and gravel feeder 41 is energized to advance the proportionate streams of sand and gravel to the charging end of the blending unit 125. The sand and gravel feed continues until the predetermined quantity of material is advanced to the blending unit 125, at which point the sand and gravel feeder 41 is decommissioned.

*Weighing apparatus*

(PACKAGING PLANT—FIGURES 1-4)

As best shown in FIGURES 2 and 3 the blending unit 125 of the blending apparatus B is suspended from the weighing mechanism 47 by means of links 48 from a scale beam 50. The scale beam is pivotally mounted with reference to the structural framework as at 51 and is connected to the weighing scale 52 by a link 53. The scale 52 includes suitable switches which are interconnected with the vibrating sand and gravel feeder 41 and with the vibrating cement feeder 44 to deenergize the feeders in response to the loading of the blending apparatus with the predetermined proportions of cement, sand and gravel.

In order to increase the sensitivity of the weighing apparatus, the links 48, which suspend the floating blending unit 125, are connected to the ends of the bell crank levers 54. The opposite ends of the bell crank levers are pivotally connected to a pair of toggle levers 55—55 having inner ends linked together as at 56. The inner end of one of the toggle levers 55 is connected by a link 57 to the end of the scale beam 50.

As the blending unit 125 is loaded, its downward motion tends to pull the toggle levers 55 outwardly by operation of the bell crank levers 54. This outward movement results in a downward toggle motion which acts through the scale beam 50 to impart upward motion to the link 53, as indicated by the arrow, thus actuating the scale 52 and causing operation of the switches which control the feeders 41 and 44 of the dehydrated sand, gravel and cement.

As explained in detail later, the flexible diaphragms of the blending apparatus B thoroughly intermix the sand, gravel and cement during the blending and bagging operation. The actual bagging operation is initiated by the operator after the weighing cycle is completed, as indicated earlier. Thus, as shown in FIGURES 1 and 3, the operator slips the open end of a bag 58 upon the discharge spout 60 of the blending apparatus B, with the bag resting on a conveyor 61. At completion of the weighing cycle, the operator actuates a dumping switch, which may be operated by a treadle, which initiates the mixing and discharge cycle of blending apparatus B.

As explained later, the pneumatically-operated diaphragms of the blending apparatus B successively discharge each batch of ingredients by gravity, causing the sand, gravel and cement to be thoroughly intermixed, then discharged into the bag 58. After the blending operation, with the ingredients discharged, the operator causes the loaded bag 58 to be advanced by the conveyor 61 to a stitching machine (not shown) which seals the open end of the bag (FIGURE 3). Thereafter, the bag is removed for storage or transportation. The operator then actuates a start switch which initiates the next weighing and blending cycle.

It will be understood, from the foregoing, that the dehydration mechanism 4 operates continuously, while the blending and bagging operations are carried out intermittently under manual control. Accordingly, the compartments 23 and 24 of the surge hopper 22 (FIGURE 5) serve to accommodate the dehydrated sand and gravel if the bagging operation is interrupted temporarily. The cement hopper 43 likewise provides temporary storage of dry cement which is fed continuously by the elevator 45 from the cement storage hopper 46.

*Modified heat exchange packaging plant (FIGURE 6)*

The modified packaging plant disclosed generally in FIGURE 6 continuously dehydrates sand and gravel or other aggregates through the heat exchange principle, similar to the packaging machine described above with reference to FIGURES 1–4. The dehydrated sand and gravel are discharged, with the proper proportion of Portland cement, into the blending unit of the apparatus, previously indicated at B. The modified packaging machine (FIGURE 6) is similar in all respects to the machine disclosed in FIGURES 1 and 2 with the exception that the heat exchange drums are mounted in the lower portion of the plant C, such that the dehydrated sand and gravel are elevated to the feeder and to the blending unit 125 upon being discharged from the dehydrating drums.

Described generally, the modified packaging plant comprises a structural steel framework 62 supporting the several components of the machine. The sand heating drum 63 is mounted for rotation in the lower portion of the framework 62 and includes circular bands 64—64 tracked upon rollers (not shown) which are journalled within the framework 62. The heat exchange drum 65 is mounted below the sand heating drum 64 and includes circular bands 66—66 tracking upon the bands 64 of the sand heating drum 63, also cradled between rollers. The sand heating drum 63 includes a ring gear 67 and the heat exchange drum 65 includes a similar ring gear 68 meshing with the ring gear 67.

A motor 70 includes a pinion 71 meshing with ring gear 68 of the heat exchange drum 65, such that motor 70 rotates both drums in unison, as described earlier with reference to FIGURE 2. The drums 63 and 65 also include internal vanes, as noted earlier with reference to FIGURE 5.

The raw moist sand is stored in the raw sand hopper 72 and the raw gravel is stored in the raw gravel hopper 73, as explained earlier with reference to FIGURES 1 and 2. From the raw sand hopper 72, the sand is fed by a vibratory feeder 74 to a sand elevator 75. The sand elevator includes a chute 76 (shown in broken lines) which delivers the raw sand from the sand elevator 75 to the charging end of the sand heating drum 63.

The heated sand flows from the discharge end 77 of the sand heating drum 63 to a collector housing 78, which is similar to the housing 13, described earlier with reference to FIGURE 2. The collector housing 78 discharges the heated sand into the charging end 80 of the heat exchange drum 65.

The raw gravel is fed from the gravel hopper 73 by a vibratory feeder 81 to a raw gravel elevator 82 (FIGURE 6). The raw gravel elevator 82 includes a gravel deflector 83 which feeds the raw gravel into the charging end 80 of the heat exchange drum 65 to be commingled with the hot dehydrated sand for dehydrating the gravel by heat exchange. The discharge end of the heat exchange drum 65 includes a separator screen 84, similar to the screen 20 previously described (FIGURES 2 and 5), which separates the sand from the gravel and discharges the sand and gravel into separate compartments of a surge hopper 85. Hopper 85 is identical to the surge hopper 22 shown in FIGURE 5. A vibratory feeder 86, similar to the feeder 41 (FIGURE 5) conveys the sand and gravel from the lower end of the surge hopper 85 to an elevator 87 (FIGURE 6), which lifts the dehydrated sand and gravel to the blending apparatus B. In the present example, the blending apparatus B is also of the double diaphragm type shown in FIGURES 1–4 and the upper blending unit 125 is suspended from a weighing apparatus 88, similar to the weighing apparatus 47 previously described with reference to FIGURE 3. In the present example, the elevator 87 for the dehydrated sand and gravel includes a downwardly projecting spout 90 which discharges into a cylindrical collector chute 91 leading to the blending unit 125 of the blending apparatus B.

The dry cement is stored in a cement hopper 92 (FIGURE 6) which includes a vibratory feeder (not shown) for advancing the cement to a cement elevator 93. The cement elevator includes a discharge spout 94 leading to a cement surge hopper 95, as indicated in broken lines (FIGURE 6). From the surge hopper 95, the cement is fed by means of a vibratory feeder 44 to the charging end 42 of the blending unit 125 to be commingled with the dehdyrated sand and gravel and discharged into the bag 58.

As explained earlier with reference to FIGURE 6, the weighing apparatus 88 (during the weighing cycle) shuts down the vibratory feeder 86 when the predetermined quantities of dehydrated sand and gravel are advanced from the surge hopper 85 by way of the elevator 87 to the charging end of the blending apparatus B. In the same manner, the vibratory feeder (not shown) advances the cement from the cement hopper 92 to the charging end 42 of the blending unit 125. When the predetermined amount of cement (by weight) is fed into the blending unit 125, the weighing apparatus 88 shuts down the vibratory cement feeder. At this stage, the blending apparatus is fully charged and ready to blend and bag the dehydrated sand, gravel and cement upon initiation of the dumping cycle, as explained later in detail.

Modified packaging plant with fixed blending apparatus (FIGURE 7)

The blending apparatus, indicated generally at D, (FIGURE 7) is adapted to be used as a conversion unit in conjunction with the apparatus for proportioning and mixing materials disclosed in the Avril Patent 2,530,501, issued on Nov. 21, 1950.

In general, the packaging machine disclosed in the earlier Avril Patent 2,530,501 includes a first scale hopper 100 suspended from a scale beam 101 adapted to receive a predetermined weight load of sand, indicated at 102 and a predetermined load of aggregates (coarse and fine gravel) 103. The sand 102 is fed into the scale hopper 100 by means of a vibratory sand feeder 104. The aggregates 103 (gravel) are fed into the scale hopper 100 by means of a second vibratory feeder (not shown).

The scale beam 101 is interconnected with an electrically operated control apparatus which regulates the vibratory sand feeder 104 and the vibratory aggregate feeder. In general, the control apparatus is arranged to feed a predetermined quality (by weight) of sand 102 by way of feeder 104 into the hopper 100, then to shut down the sand feeder 104 and to initiate operation of the gravel feeder (not shown) until the predetermined quality (by weight) of gravel 103 is fed into scale hopper 100 above the sand. At this point, the control apparatus, in response to the total weight load, shuts down the sand and gravel feeders.

The dry cement is fed into the cement scale hopper 105 by way of a vibratory cement feeder 106. The cement scale hopper 105 is suspended from a second scale beam 107 (FIGURE 7) which is also interconnected with the electrical control system. The control system is arranged to shut down the cement feeder 106 when a predetermined quantity (by weight) of dry Portland cement 108 is fed into the cement hopper 105. The sand feeder 104 and the aggregate feeder (not shown) are energized dependently of one another by means of an electrical control circuit interconnected with the scale beam 101. The scale beam 107 of the cement scale hopper 105 is also interconnected with the electrical control system.

The operating cycle of the weighing apparatus is initiated preferably by a start button (not shown) which causes operation of the vibratory feeders of the sand, aggregates and cement, whereby the respective materials are fed into the scale hoppers 100 and 105. When the scale hoppers 100 and 105 are fully charged they over-balance respective counter-weights mounted upon the scale beams 101 and 107. The scale beams, by virtue of the electrical control system, deenergize the vibratory feeders when the scale hoppers 100 and 105 are fully charged. A signal lamp indicates the point at which both hoppers 100 and 105 are fully charged. At this point, a manual dump button (not shown) is depressed by the operator to discharge the contents of both hoppers 100 and 105 into the blending apparatus D, which thoroughly intermixes the sand, aggregates and cement and discharges the mixture into the bag.

In order to discharge the sand 102, the aggregates 103 and the cement 108 simultaneously into the blending apparatus D, the scale hoppers 100 and 105 are provided with electrically operated doors 110 and 111. These doors are opened simultaneously by means of respective solenoids 112 and 113 which are interconnected by means of respective toggle linkages 114 and 115 to the doors. When the dump button is depressed, both the solenoids 112 and 113 are energized, causing the doors 110 and 111 to be shifted to the open position as, indicated by the broken lines 116 of the aggregate hopper 100. The predetermined quantities of sand, aggregate and cement are thus discharged concurrently into the blending apparatus D.

Each door 110 and 111 is interconnected with a respective limit switch 117—117 by means of levers 118—118. The limit switches 117 are interconnected with the control circuit to prevent starting of the vibratory feeders of the sand, aggregates and cement until both doors 110 and 111 are closed after the dumping, blending and bagging operation. The limit switches 117 also prevent starting of the feed cycle if, for one reason or another, one or both of the doors 110 and 111 are not completely closed at completion of the dumping, blending and bagging operation. After the dumping operation, the next feeding and weighing cycle is initiated by the operator who depresses a start button (which forms a part of the control system), thereby commissioning the vibratory feeders which feed the sand, aggregates and cement to the scale hoppers.

The fixed blending apparatus D (FIGURE 7) is hung from the floor 120 of the packaging plant and is not interconnected in any way with the weighing apparatus.

The fixed blending apparatus D (FIGURE 7), in general, comprises a cylindrical chamber 121, which is suspended from the floor 120 immediately below the scale hoppers 100 and 105. In order to direct the flow streams of Portland cement, dehydrated sand and aggregates into the cylindrical chamber 121, there is provided a cone-shaped chute 122. Chute 122 encircles the discharge end of the scale hoppers 100 and 105 and its lower end includes an opening 123 communicating with the chamber 121. The chute 122 is arranged to discharge the ingredients into the first and second blending units of the blending apparatus. The two blending units 125 and 130 lead to a cone-shaped collector chute 124 having a spout 60. As noted earlier, the bag 58 is slipped upon the spout 60 to receive the ingredients after the blending operation.

Double diaphragm blending apparatus (FIGURES 1, 2, 3 and 8)

The double diaphragm blending apparatus B disclosed in the views indicated above comprises a cylindrical chamber indicated generally at 126 which includes a receiving chute 127 (FIGURE 8) which is cone-shaped, including an open charging end 42. In this form of the invention, the receiving hopper or blending unit 125 is suspended from the *links* 48 of the weighing scale 47, with the vibratory cement feeder 44 and the aggregate feeder 41 arranged to deliver the sand, aggregates and cement into the blending unit 125. The receiving chute 127 communicates with a cylindrical ring 128 (FIGURE 8), secured to the lower edge of the cone-shaped receiving chute 127. The lower edge of the cylindrical ring 128 interfits the large end of an inverted cone-shaped deflector 131.

As described earlier, the structure comprising the receiving chute 127, cylindrical ring 128 and cone-shaped deflector 131 form a unit which is suspended by the *links* 48—48, of the weighing apparatus 47. As described earlier, the predetermined proportions of the sand and aggregates (by weight) are fed into the blending unit 125 (FIGURES 3 and 8) by operation of the vibrating feeder 41. The proper proportion of cement is fed into the blending unit 125 by the vibratory cement feeder 44. The sand and aggregate feeder 41 and the dry cement feeder 44 are controlled in sequence by the weighing mechanism 47, which shuts down the two feeders 41 and 44 in sequence as the required weight load of sand, aggregates and cement are fed into the upper blending unit 125, which is suspended by the *links* 48 from the weighing apparatus.

As the sand and aggregates (vibratory feeder 41) and the cement vibratory feeder 44 are fed successively into the upper blending unit 125, the materials fall by gravity into a diaphragm 132 which is mounted within the cone-shaped pressure-vacuum housing 133. The diaphragm 132, in its inverted receiving position shown in FIGURE 8 is in the form of an inverted cone so as to receive the sand, aggregates and cement which are fed into the blending unit 125 by the vibratory feeders 41 and 44. As explained earlier, with reference to FIGURE 3, the weighing apparatus is adapted to decommission the sand and aggregate feeder 41 when the required proportion of sand and aggregates have been fed into the upper blending unit 125 (FIGURE 8). In a similar manner, the cement feeder 44 is decommissioned by the weighing apparatus 47 when the required proportion (by weight) of dry Portland cement has been fed into the upper blending unit 125.

As best shown in FIGURE 8, the sand and aggregates are fed into the upper blending unit 125 by operation of the vibratory feeder 41 (see also FIGURES 1, 2, 3 and 4) and the dry Portland cement is fed into the unit 125 by operation of the vibratory feeder 44. In this example of the invention, the weighing apparatus is adapted to shut down the feeders when a predetermined quantity of dry Portland cement 108 by weight is fed into the diaphragm 132 of the upper blending unit 125. The sand 102 and aggregates 103 (FIGURE 8) are fed into the upper blending unit 125 above the Portland cement 108. When the proper proportion of ingredients by weight, have been fed into the upper blending unit 125, the weighing apparatus sends a signal to the control system indicating that the blending unit is loaded and ready to be dumped into the bag 58 (FIGURES 17–20).

Described in detail as shown in FIGURES 8, 9, 10 and 11, the double diaphragm blending apparatus B includes the upper unit 125 and the lower blending unit 130 mounted within the fixed cylindrical chamber 126. The chamber 126 is mounted in a fixed position upon the structural iron framework 28 having beams 134 forming a part of the packaging plant A. The diaphragm 132 of the lower blending unit 130 is identical to the upper unit 125 and is mounted within a cone-shaped pressure-vacuum housing 133. The lower end of the cylindrical chamber 126 includes a chute 135 which is in the form of an inverted cone adapted to receive the mixture of sand, aggregates and dry Portland cement as it is discharged from the lower blending unit 130.

As best shown in FIGURES 12 and 13, the diaphragm 132 in the several forms of the invention is formed of rubber and normally assumes the inverted, cone-shaped position illustrated in FIGURE 10. In order to prevent ballooning and to provide progressive erection of the diaphragm which, under air pressure, assumes the erected position (FIGURES 11 and 12). The internal diameter of the diaphragm 132 is provided with a series of spaced ribs indicated generally at 136, which reinforce the wall of the diaphragm. In the form illustrated in FIGURE 12, the upper end of the diaphragm includes a flat portion 137. As shown in FIGURES 9 and 10, the flat portion 137, when the diaphragm is inverted, assumes the shape of a small erect cone as indicated at 138.

Described in detail, the base of the cone-shaped diaphragm 132 (FIGURES 9–12) includes a horizontal base 141 having a circular vertical flange 142. The vertical flange 142 includes a series of ribs 143 and a bead 144 which aid in providing an air-tight connection with the marginal portion of the cone-shaped pressure-vacuum housing 133.

As best shown in FIGURE 13, each diaphragm 132 is mounted within its cone-shaped housing 133 by means of a clamping ring 146, which includes lugs 147 (FIGURE 9) which are compressed by a clamping screw 148. As shown in FIGURE 13, the vertical flange 142 of the diaphragm 132 fits upon a vertical flange 151 which forms a part of the cone-shaped pressure-vacuum housing 133. Thus the clamping ring 146 draws the flange 142 of the diaphragm firmly into air-tight connection with the flange 151 of the housing 133. The circular ribs 143 and bead 144, previously noted (FIGURE 12), provide a series of line contacts which form a seal to prevent the escape of air pressure and vacuum from the space 152 between the housing 133 and diaphragm 132.

It will be understood at this point, that air pressure is supplied by way of the conduit 153 and manifold 154 to the space 152 (FIGURES 10, 11, 14–16) between the cone-shaped housing 133 and diaphragm 132; vacuum is also supplied by way of the same manifold 154 from a suitable source. Thus, as shown in the diagrammatic views (FIGURES 14–16) suction is applied to the manifold 154, as indicated by the arrow 155 to pull the diaphragm 132 to its collapsed, inverted position (FIGURE 14), while air pressure is supplied to the manifold 154, as indicated by the arrow 156 (FIGURE 15) to erect the diaphragm.

In addition to the conduit 153 (FIGURES 9 and 10), there is provided a second conduit 157, also communicating with the cone-shaped housing 133 of each blending unit 125 and 130. The conduit 157 communicates with a safety valve 158 (FIGURE 8) and also with a dial 160. The dial indicates the internal pressure acting upon the diaphragm and the safety valve 158 is arranged to release excess air pressure during operation so as to prevent any damage to the diaphragm.

In the present apparatus, the diaphragms are operated under a pressure in the neighborhood of 26 to 32 ounces p.s.i. to provide rapid erection and a vacuum of 6 to 8 ounces p.s.i. These figures are cited merely as an example since the pressures and negative pressures may be varied in accordance with operating characteristics.

In order to dislodge any particles of sand and cement which may adhere to the cone-shaped deflector 131 of the blending unit 125 and to the cone-shaped chute 135, each being provided with an electrical vibrator 161 (FIGURES 8 and 10). These vibrators are of commercial design and are arranged to impart vibratory motion to the cone-shaped deflectors during the dumping cycle of the machine, so as to dislodge any adhering particles. The vibrators 161 are energized by the control system during the operating cycle of the machine.

As described later in the chapter entitled "Operation of Double Diaphragm Blender" the mixture of dry Portland cement 108 (FIGURE 8), and the sand 102 and aggregates 103, which are charged into the upper blending unit 125, subsequently are discharged by air pressure, so as to deliver the ingredients, at least partially mixed, into the second blending unit 130. In order to discharge the mixture, compressed air is forced into the housing 133 of the first blending unit 125, thus forcing the diaphragm 132 from the inverted position of FIGURE 8 to the erected position indicated in FIGURES 11, 15 and 16. This action is repeated with respect to the second unit 130, which also includes an air pressure conduit 153.

As best shown in FIGURE 9, the air pressure line 153 leads to a manifold 154 partially surrounding the cylindrical chamber 126 and having radial conduits 162—162 which communicate with the blending unit 125 and 130. The conduits 162 are connected with an air pressure supply unit, and through a suitable valving system with a vacuum unit.

*Operation of double diaphragm apparatus B*

At the start of a given mixing cycle (FIGURES 17–20) the control system feeds the proper proportions of dry Portland cement, sand and gravel, as indicated at L (FIGURE 17) into the upper blending unit 125, with the diaphragm in its inverted position. The previous batch of ingredients, as indicated at M (FIGURE 17) is shown in mixed condition in the lower blending unit 130 (FIGURE 17).

While the batch L (FIGURE 17) is being fed into the upper unit 125 but before completion of loading (in order to save time), the diaphragm of the lower unit 130 (FIGURE 18) is shifted to its erected position, thus completing the blending operation as the batch M is discharged into the bag 58. As explained earlier, the control system supplies air pressure by way of the conduits 162 to erect the diaphragms of the units 125 and 130 and vacuum to shift the diaphragms alternately back to their collapsed inverted loading position, as shown in FIGURES 17–20. Thus, the mixing operation takes place in two stages as any given batch is discharged from the upper unit 125 to the lower unit 130 and from the lower unit 130 into the bag.

Described in somewhat greater detail, the predetermined quantity of Portland cement, previously indicated at 108 (FIGURES 17 and 18) is first fed into the upper unit 125, as represented by the batch L. The operator manually closes a start switch to initiate any given cycle, that is, to start the feeders 41 and 44 for feeding in the cement and aggregates. The sand 102 and gravel 103 is then fed into the upper unit above the Portland cement, the ingredients thus being in segregated condition (FIGURE 18).

As noted earlier, the bag 58 (FIGURE 17) is attached to the spout 60 during the operation of loading the upper blending unit 125, with the batch M discharged into the lower unit 130. After attaching the bag 58 the operator closes the dump switch, causing the lower unit 130 (FIGURE 18) to discharge its batch into the bag (FIGURE 18).

As explained earlier, the diaphragms 125 and 130 are shifted in sequence from the collapsed or inverted position (FIGURE 17) to the erected position by applying air pressure (conduits 162) to the space 152 between the cone-shaped shroud 133 and diaphragm 132. The diaphragms are retracted in sequence to their collapsed or retracted loading positions by the application of negative pressure or vacuum by way of the conduits 162.

*Triple diaphragm blending apparatus F*

The triple diaphragm blending apparatus, previously indicated at F (FIGURE 21) in principle and in construction is similar to the double diaphragm blending apparatus B (FIGURES 1, 3 and 8). As best shown in FIGURE 21, the triple diaphragm blending apparatus F includes three blending units 140, 145 and 150. The upper blending unit 140 comprises a scale hopper which is suspended from the suspension links 48 of the weighing apparatus, as described earlier with reference to FIGURES 1-3 and 8. The triple diaphragm apparatus includes a cylindrical chamber 163, similar to the chambers 126, as described earlier. Its lower end includes a chute 124, leading to a spout 60, to which the bag is attached, as described earlier.

Each of the blending units 140, 145 and 150 is actuated by means of respective manifolds 154, each having radial conduits 162 communicating with the cone-shaped housing 133. Each blending unit also includes a vibrator 161 and a conduit 157 leading to a safety valve 158 and to a pressure indicating dial 160. Air pressure for erection is supplied to the three blending units 140, 145 and 150 in sequence by means of respective conduits 153 interconnected with the manifolds 154, as described earlier. The diaphragms are retracted in sequence by application of vacuum to the manifolds 154 by way of the conduits 153.

Each blending unit 140, 145 and 150 comprises the rigid cone-shaped housing 133, with a flexible diaphragm 132 which is sealed with respect to the housing, to provide a self-contained blending unit, as described earlier with reference to FIGURES 12 and 13.

In the modified arrangement shown in FIGURES 31 and 32, which represents a triple diaphragm apparatus F similar to that shown in FIGURE 21, each blending unit is provided with a flexible skirt or shroud G, also indicated at 164, formed of rubber or a similar flexible material. In each case, the skirt is attached to the lower end of the cone-shaped deflector 131 by means of a clamping ring 165.

As shown in FIGURE 32, each skirt includes a generally cone-shaped spider 166, previously indicated at H. The spider is formed of wire stock comprising, in the present example, two crossed wires formed to provide four legs. The lower ends of the legs are secured as at 167 (FIGURE 32) to the lower end portion of the skirt 164.

As the diaphragm 132 of the blending unit below the skirt is shifted to its erected position, its upper portion embraces the spider 166 and thus compresses the skirt (skirt K FIGURE 32). The purpose of the skirt is to control the flow of the ingredients as they are discharged from the erected diaphragm and to improve the blending action.

*Operation of triple diaphragm blending apparatus F*

The general principle of operation of the triple diaphragm blending apparatus F is similar to that previously disclosed with reference to the double diaphragm arrangement B, as shown in FIGURES 17-20. The triple diaphragm apparatus provides more rapid operation and, in the instance of certain ingredients, provides a more thorough blending action.

As illustrated in the simplified diagrammatic views (FIGURES 22-25), the diaphragms of the three blending units 140, 145 and 150 are erected and collapsed in sequence. Thus, as best shown in FIGURE 22, the diaphragm of the upper blending unit 140 is shown being loaded with metered quantities of cement, sand and aggregates, the batch being indicated at N. Upon being fully loaded into the upper scale hopper, the batch N is discharged by erection of the diaphragm of the top blending unit 140 so as to flow by gravity into the next blending unit 145, as indicated at N (FIGURE 23). After having been discharged into the second blending unit 145, the batch N is discharged into the lower blending unit 150 (FIGURE 24). Thereafter, the batch N is discharged into the bag 58 (FIGURE 25) at which point the ingredients are thoroughly blended and ready for the market.

The simplified diagrams of FIGURES 22-25 are intended to illustrate the basic principles of operation of the triple unit, utilizing the single batch N as an example.

However, as noted earlier, one of the advantages of the triple diaphragm structure F is to provide more rapid packaging (FIGURES 26-30). In other words, the triple diaphragm arrangement permits two batches of ingredients to be blended concurrently.

Thus, as shown in FIGURE 26, the two lower blending units 145 and 150 contain the blended batches O and P, the batch P being ready for discharge into the bag 58. At about the time the batch P is discharged, into the bag (FIGURE 27) a third batch, indicated at Q (FIGURE 27) is being fed into the upper blending unit 140. After the upper blending unit (which comprises the scale hopper) is loaded with the batch Q (FIGURE 28), the diaphragm of the intermediate blending unit 145 is erected, causing the batch O to flow, as indicated by the arrows, into the lowermost blending unit 150.

After the batch O is discharged into the lowermost blending unit 150 (FIGURE 29) the diaphragm of the uppermost blending unit 140 is erected, so as to discharge the batch Q into the intermediate blending unit 145. Thereafter, the diaphragm of the upper blending unit 140 is retracted to its collapsed position (FIGURE 30) so as to permit the next batch R to be fed into the upper weighing hopper (FIGURE 30). At about the same time, the diaphragm of the lower blending unit 150 is shifted to its erected position so as to discharge the batch O into the bag (FIGURE 30).

The actuation of the diaphragms, whether the double diaphragm apparatus 3 (FIGURES 17-20) or the triple diaphragm apparatus F (FIGURES 26-30) is regulated by a control system (not shown). In general, the control system comprises an electrical circuit, combined with a pneumatic system for applying pressure and vacuum to the blending units in the proper sequence. As noted above, the weighing apparatus is automatic and after the start switch is closed indicates to the operator by means of a signal light that the ingredients in propor proportion have been charged into the weighing unit.

At this point the operator initiates the dumping cycle by closing a second switch, causing the electrical circuit to operate the air valves in proper sequence to carry out the dumping cycle.

What is claimed is:

1. Apparatus for blending dry granulated materials comprising:
   a generally upright chamber;
   a blending unit mounted in said chamber;
   said blending unit comprising a housing mounted within said chamber and having an open upper end;
   a flexible, generally cone-shaped diaphragm disposed within said housing with the periphery thereof secured to the open end of said housing;
   said diaphragm adapted to be shifted from a collapsed inverted position for loading the dry granulated materials therein and adapted to be shifted thereafter to an erected upright position relative to the housing;
   and power means for shifting the diaphragm from said collapsed inverted position to the erected upright position, thereby to discharge the dry granulated materials by gravity from the chamber to blend the materials.

2. An apparatus for blending dry granulated materials comprising:
   a generally upright chamber having open upper and lower ends;
   a blending unit mounted in said chamber;
   said blending unit comprising a housing mounted within said chamber and having an open upper end;
   a flexible, generally cone-shaped diaphragm disposed within said housing with the periphery thereof secured in sealed relation to the open end of said housing;
   said diaphragm normally residing in a collapsed inverted position within said housing and in spaced relation thereto and forming a vessel adapted to receive the dry granulated materials therein;
   said diaphragm adapted to be shifted thereafter to an erected upright position;
   means for supplying fluid pressure to the space between said housing and diaphragm, thereby to shift the diaphragm from said collapsed inverted position to the erected position, thereby to discharge the granulated materials by gravity from the open lower end of the chamber and to blend the materials.

3. An apparatus for blending dry granulated materials comprising:
   a generally upright chamber having open upper and lower ends;
   a blending unit mounted in said chamber;
   said blending unit comprising a substantially rigid pressure-vacuum housing mounted within said chamber and having an open upper end;
   a flexible, generally cone-shaped diaphragm disposed within said housing with the periphery thereof secured in sealed relation to the open end of said housing;
   said diaphragm normally residing in a collapsed inverted position within said housing and in spaced relation thereto and forming a vessel adapted to receive the dry granulated materials therein and adapted to be shifted thereafter to an erected upright position thereby providing a loading and discharge cycle;
   means for supplying fluid pressure to the space between said housing and diaphragm, thereby to shift the diaphragm from said collapsed inverted position to the erected position and to discharge the granulated materials by gravity from the open lower end of the chamber and to blend the materials;
   and means for applying vacuum to the space between the housing and diaphragm, thereby to shift the diaphragm back to said collapsed inverted position for repeating the loading and discharge cycle.

4. An apparatus for blending dry granulated materials as set forth in claim 3 in which air pressure is supplied by a plurality of conduits passing through said upright chamber and communicating with said pressure-vacuum housing, said conduits adapted to support the blending unit, with the external periphery of the blending unit spaced inwardly from the internal periphery of the upright chamber to provide clearance for the mass of material which is discharged from the diaphragm.

5. An apparatus for blending dry granulated materials as set forth in claim 3 in which the housing is of inverted cone-shape formed of rigid material and having a vertical flange extending about its open end, and in which the diaphragm is provided with a vertical flange which interfits the vertical flange of the housing, and a compressible ring encircling the vertical flange of the diaphragm and adapted to clamp and seal the diaphragm with respect to the flange of the housing.

6. An apparatus for blending dry granulated materials as set forth in claim 5 in which the base of the cone-shaped diaphragm includes a horizontal flange extending around the periphery of the base and in which the vertical flange depends downwardly from the periphery of the horizontal flange.

7. An apparatus for blending dry granulated materials as set forth in claim 5 in which the internal surface of the cone-shaped diaphragm is provided with a series of annular ribs spaced apart from one another and adapted to reinforce the cone-shaped wall of the diaphragm.

8. An apparatus for blending dry granulated materials as set forth in claim 5 in which the internal surface of the cone-shaped diaphragm is provided with a series of annular ribs spaced apart from one another and adapted to reinforce the cone-shaped wall of the diaphragm, said annular ribs adapted to preserve the conical shape of the diaphragm and to prevent ballooning thereof when the diaphragm is shifted to said erected position in response to the application of the fluid pressure to the space between the said housing and diaphragm.

9. An apparatus for blending metered quantities of dry granulated material comprising:
   a generally upright chamber having open upper and lower ends;
   weighing apparatus mounted above said chamber and adapted to meter the dry materials and to charge the metered materials into said upright chamber;
   a flexible, generally cone-shaped diaphragm, mounted in said chamber, said diaphragm adapted to be shifted from a collapsed inverted position forming a vessel adapted to receive the dry granulated materials therein and adapted to be shifted thereafter to an erected upright discharge position;
   means for discharging said metered quantities of dry granulated materials from the weighing apparatus into said collapsed inverted diaphragm;
   and power means for shifting the diaphragm from said collapsed inverted loading position to the erected upright discharge position thereby to discharge the dry granulated materials by gravity from the open lower end of the chamber and to blend the materials.

10. An apparatus for blending metered quantities of dry granulated material comprising:
    a generally upright receiving chute having open upper and lower ends;
    weighing apparatus connected to said receiving chute for supporting the same;
    a flexible, generally cone-shaped diaphragm mounted in said receiving chute, said diaphragm adapted to be shifted to a collapsed inverted position forming a vessel for receiving the dry granulated materials therein and adapted to be shifted thereafter to an erected upright discharge position;
    said quantities of dry granulated materials adapted to be fed into the open upper end of the receiving chute and into said collapsed inverted diaphragm, whereby the weighing apparatus responds to the quantities of dry materials fed into said diaphragm in said inverted loading position;

and power means for shifting the diaphragm from said collapsed inverted loading position to the erected upright position, thereby to discharge the dry granulated materials by gravity from the open lower end of the receiving chute and to blend the materials.

11. An apparatus for blending dry granulated materials as set forth in claim 9 in which the receiving chute includes a deflector of inverted cone-shape having an open lower end and in which there is provided a fixed upright chamber disposed beneath said receiving chute, and a second generally cone-shaped diaphragm mounted within said fixed chamber and adapted to receive the materials from the diaphragm of said receiving chute.

12. An apparatus for blending metered quantities of dry granulated material comprising:

a generally upright receiving chute having open upper and lower ends;

weighing apparatus connected to said receiving chute for supporting the same;

feeding means for advancing the dry granulated materials to the receiving chute;

a flexible, generally cone-shaped diaphragm mounted in said receiving chute, said diaphragm adapted to be shifted from a collapsed inverted position for loading the dry granulated materials therein and to be shifted thereafter to an erected upright position;

power means for feeding said metered quantities of dry granulated materials into the open upper end of the receiving chute and into said collapsed inverted diaphragm, whereby the weighing apparatus responds to the quantities of dry materials fed into said diaphragm in said inverted loading position;

said weighing apparatus adapted to decommission said feeding means when predetermined quantities of dry granulated material have been fed into said inverted diaphragm;

and power means for shifting the diaphragm from said collapsed inverted loading position to the erected upright position, thereby to discharge the dry granulated materials by gravity and to blend the materials.

13. An apparatus for blending dry granulated materials comprising:

a generally upright chamber having open upper and lower ends;

a plurality of blending units mounted within said chamber one above the other;

each of said blending units comprising a rigid housing secured within said upright chamber and having an open upper end, each of said housings having an external periphery smaller than the internal periphery of the chamber;

a flexible, generally cone-shaped diaphragm disposed within each of said housings with the periphery thereof secured to the open end of said housing;

each of said diaphragms adapted to be shifted from a collapsed inverted position for loading the dry granulated materials therein and adapted to be shifted thereafter to an erected upright discharge position;

means for shifting the diaphragms from said collapsed inverted loading position to the erected upright discharge position;

said means adapted to erect said diaphragms successively starting with the uppermost diaphragm of said plurality, thereby to discharge the dry granulated materials successively from the upper diaphragm to the lower diaphragms by gravity to blend the materials during passage downwardly through said upright chamber.

14. An apparatus for blending dry granulated materials comprising:

a generally upright chamber having open upper and lower ends;

a plurality of blending units mounted within said chamber one above the other;

each of said blending units comprising a rigid housing secured within said upright chamber and having an open upper end;

a flexible, generally cone-shaped diaphragm disposed within said housing with the periphery thereof secured to the open upper end of said housing;

each of said diaphragms adapted to be shifted from a collapsed inverted position for loading the dry granulated materials therein and adapted to be shifted thereafter to an erected upright discharge position;

means for shifting the diaphragms from said collapsed inverted loading position to the erected upright discharge position;

said means adapted to erect said diaphragms successively starting with the uppermost diaphragm of said plurality, thereby to discharge the dry granulated materials successively from the upper diaphragm to the lower diaphragms by gravity to blend the materials during passage through said upright chamber;

and a deflector mounted at the lower open end of the upright chamber, said deflector being generally in the form of an inverted cone and adapted to provide a final blending action as the materials flow from the lowermost blending unit of said plurality.

15. An apparatus for blending dry granulated materials as set forth in claim 13 in which at least one of the blending units is provided with a deflector mounted with respect to the blending unit to receive the materials discharged therefrom, the material discharged from the blending unit flows by gravity down the wall of the deflector to be additionally blended during passage downwardly through the upright chamber.

16. An apparatus for blending dry granulated materials as set forth in claim 15 in which at least one of the deflectors is provided with a vibrator unit adapted to impart vibratory motion to the deflector, thereby to dislodge any particles of the material which may adhere to the surface of the deflector.

17. An apparatus for blending dry granulated materials as set forth in claim 13 in which each blending unit is surrounded, at least in part, by a deflector which is generally of inverted cone-shape having open upper and lower ends and in which the materials discharged from the blending units flow down the walls of said deflectors by gravity, to successively aid in blending the materials during passage downwardly through the upright chamber.

18. An apparatus for blending dry granulated materials and discharging the blended materials into a bag comprising:

a generally upright chamber having open upper and lower ends;

a plurality of blending units mounted within said chamber one above the other;

each of said blending units comprising a rigid housing secured within said upright chamber and having an open upper end;

a flexible, generally cone-shaped diaphragm disposed within said housing with the periphery thereof secured to the open upper end of said housing;

each of said diaphragms adapted to be shifted from a collapsed inverted position for loading the dry granulated materials therein and adapted to be shifted thereafter to an erected upright discharge position;

means for shifting the diaphragms from said collapsed inverted loading position to the erected upright discharge position;

said means adapted to erect said diaphragms successively starting with the uppermost diaphragm of said plurality, thereby to discharge the dry granulated materials successively from the upper diaphragm to the lower diaphragms by gravity to blend the materials during passage through said upright chamber;

a deflector mounted at the lower open end of the upright chamber, said deflector being generally in the form of an inverted cone having an open lower end, said deflector adapted to provide a final blending action as the materials flow from the lowermost blending unit of said plurality;

said deflector including a spout at the lower open end thereof adapted to receive a bag, whereby the blended materials are discharged directly into the bag after passing through the blending apparatus.

19. A method of blending a combination of dry materials, either of uniform or of varying particle sizes and of different specific gravities comprising the steps of:

providing a generally cone-shaped diaphragm formed of flexible material and normally depressed to an inverted receiving position to form a vessel, with the apex of the cone-shaped diaphragm disposed at the lower end thereof;

feeding said combination of dry materials in metered quantities into said cone-shaped diaphragm, with the diaphragm in said inverted receiving position forming said vessel;

shifting said diaphragm from said inverted receiving position to an erected upright position with the apex of the cone at the upper end thereof, thereby to propel the material from the diaphragm;

and thereafter collecting said combination of blended dry materials.

20. A method of blending a combination of dry materials, either of uniform or of varying particle sizes and of different specific gravities comprising the steps of:

providing a generally cone-shaped diaphragm formed of flexible material and normally depressed to an inverted receiving position to form a vessel, with the apex of the cone-shaped diaphragm disposed at the lower end thereof;

feeding said combination of dry materials in metered quantities into said cone-shaped diaphragm, with the diaphragm in said inverted receiving position forming said vessel;

shifting said diaphragm from said inverted receiving position to an erected upright position with the apex of the cone at the upper end thereof, thereby to propel the material from the diaphragm in the form of a relatively thin flow stream discharged from around the base of the cone-shaped erected diaphragm in the form of a cascade, thereby to propel and commingle the combination of dry materials;

and thereafter collecting said combination of blended dry materials.

21. A method of blending a combination of dry materials, either of uniform or of varying particle sizes and of different specific gravities comprising the steps of:

providing a generally cone-shaped diaphragm formed of flexible material and normally depressed to an inverted receiving position to form a vessel, with the apex of the cone-shaped diaphragm disposed at the lower end thereof;

feeding said combination of dry materials in metered quantities into said cone-shaped diaphragm, with the diaphragm in said inverted receiving position forming said vessel;

shifting said diaphragm from said inverted receiving position to an erected upright position with the apex of the cone at the upper end thereof, thereby to propel the material from the diaphragm in the form of a circular, relatively thin flow stream discharged from around the base of the cone-shaped erected diaphragm in the form of a cascade, thereby to propel and commingle the combination of dry materials;

deflecting the said mass of material cascading from the erected diaphragm, thereby to increase the blending action which is provided by said cone-shaped diaphragm;

and thereafter collecting said combination of blended dry materials.

22. A method of blending and packaging a combination of dry materials, either of uniform or of varying particle sizes and of different specific gravities comprising the steps of:

providing a generally cone-shaped diaphragm formed of flexible material and normally depressed to an inverted receiving position to form a vessel, with the apex of the cone-shaped diaphragm disposed at the lower end thereof;

feeding said combination of dry materials in metered quantities into said cone-shaped diaphragm, with the diaphragm in said inverted receiving position forming said vessel;

shifting said diaphragm from said inverted receiving position to an erected upright position with the apex of the cone at the upper end thereof, thereby to propel the material from the diaphragm in the form of a circular, relatively thin flow stream discharged from around the base of the cone-shaped erected diaphragm in the form of a cascade, thereby to propel and commingle the combination of dry materials;

deflecting the said mass of material cascading from the erected diaphragm, thereby to increase the blending action which is provided by said cone-shaped diaphragm;

thereafter collecting said combination of blended dry materials;

and immediately packaging the combination of dry materials.

23. A method of blending a combination of dry materials, either of uniform or of varying particle sizes and of different specific gravities comprising the steps of:

providing a generally cone-shaped diaphragm formed of flexible material and depressing the same to an inverted receiving position to form a vessel, with the apex of the cone-shaped diaphragm disposed at the lower end thereof;

feeding said combination of dry materials in metered quantities and in segregated layers into said cone-shaped diaphragm, with the diaphragm in said inverted receiving position forming said vessel;

shifting said diaphragm from said inverted receiving position to an erected upright discharge position, with the apex of the cone at the upper end thereof to propel the material from the diaphragm thereby to blend and commingle the combination of dry materials;

and thereafter collecting said combination of blended dry materials.

24. A method of blending a mass of dry materials either of uniform or of varying particle sizes and of different specific gravities comprising the steps of:

providing a generally cone-shaped flexible diaphragm adapted to be depressed to an inverted position to form a vessel for receiving a mass of dry materials with the apex of the cone-shaped diaphragm disposed at the lower end of the diaphragm;

applying pressure to said diaphragm, thereby expanding said diaphragm from the said inverted position to an erected upright position to form an erected cone with the apex of the cone at the top of the diaphragm, thereby to propel the mass of material from the diaphragm and to blend and commingle the combination of dry materials;

impinging the material from the diaphragm upon a deflector, thereby to further commingle and blend the materials;

and thereafter collecting said mass of blended materials.

25. A method of blending and bagging a combination of dry materials, either of uniform or of varying particle sizes and of different specific gravities comprising the steps of:

provided a generally cone-shaped flexible diaphragm and depressing the same to an inverted position to form a vessel for receiving a mass of said dry materials, with the apex of the cone-shaped diaphragm disposed at the lower end of the diaphragm;

shifting said diaphragm from the said inverted position to an erected upright position to form an upright cone with the apex of the cone at the top of the diaphragm, thereby to propel the mass of material from the diaphragm and to blend and commingle the combination of dry materials;

thereafter deflecting said combination of dry materials to provide a final blending action;

and discharging the blended materials into a bag immediately after said final deflecting and blending operation.

26. A method of blending a mass of dry materials either of uniform or of varying particle sizes and of different specific gravities comprising the steps of:

providing a generally cone-shaped flexible diaphragm adapted to be depressed to an inverted position to form a vessel for receiving a mass of dry materials with the apex of the cone-shaped diaphragm disposed at the lower end of the diaphragm;

applying pressure to said diaphragm, thereby expanding said diaphragm from the said inverted position to an erected upright position to form an erected cone with the apex of the cone at the top of the diaphragm, thereby to propel the mass of material from the diaphragm and to blend and commingle the combination of dry materials;

impinging the materials from the diaphragm upon a deflector, thereby to further commingle and blend the materials;

collecting said combination of blended materials;

and thereafter applying vacuum to said flexible diaphragm and thereby depressing the diaphragm from said erected to said inverted position forming a vessel with the apex disposed at the lower end thereof to form a vessel for receiving the next mass of dry materials.

27. A method of blending a combination of dry materials forming a mass either of uniform or of varying particle size and of different specific gravities comprising the steps of:

providing at least two generally cone-shaped diaphragms formed of flexible material and normally depressed to an inverted receiving position forming respective vessels, with the apex of each cone-shaped diaphragm disposed at the lower end thereof;

said diaphragms being disposed one above the other and the upper diaphragm being adapted to receive said dry materials in said normally depressed position forming a vessel;

feeding said mass of material into said upper diaphragm;

shifting said upper diaphragm from said inverted position to an erected upright position to form an erected cone, with the apex of the cone at the top of the diaphragm, thereby to propel the mass of material from the upper diaphragm, with the cone-shaped diaphragm therebelow in said depressed position, thereby stopping and collecting the mass of material in said lower diaphragm in its depressed receiving position to at least partially blend said mass of dry materials;

and shifting said second diaphragm from said inverted receiving position to an erected upright positon, with the apex thereof at the upper end, thereby propelling the mass of material from the second diaphragm to complete the blending action.

28. A method of blending a combination of dry materials forming a mass either of uniform or of varying particle sizes and of different specific gravities comprising the steps of:

providing at least two generally cone-shaped diaphragms formed of flexible material and normally depressed to an inverted receiving position to form a vessel, with the apex of the cone-shaped diaphragm disposed at the lower end thereof;

feeding said mass of material into said upper diaphragm;

shifting the upper diaphragm from said inverted receiving position to an erected upright discharge position, with the apex of the cone at the upper end thereof, thereby to propel the material from the upper diaphragm in a form of a circular, relatively thin flow stream discharged from around the base of the erected cone-shaped diaphragm in the form of a cascade, thereby to partially blend and commingle the combination of dry materials;

deflecting the materials which are discharged from the upper diaphragm into the lower diaphragm;

stopping and collecting said flow stream of dry materials in the lower diaphragm and thereby at least partially blending the mass of material;

shifting the lower diaphragm from the inverted depressed position to an erected upright position to form an erected cone with the apex of the cone at the top thereof, thereby to propel the partially blended mass of material from the second diaphragm in the form of a circular, relatively thin flow stream which is discharged from around the base of the cone in the form of a cascade;

and thereafter collecting said mass of blended dry materials which issue from the second diaphragm in blended condition.

29. A method of blending a combination of dry materials forming a mass either of uniform or of varying particle sizes and of different specific gravities comprising the steps of:

providing at least two generally cone-shaped diaphragms formed of flexible material and normally depressed to an inverted receiving position to form a vessel, with the apex of the cone-shaped diaphragm disposed at the lower end thereof;

feeding said mass of material into said upper diaphragm;

shifting the upper diaphragm from said inverted receiving position to an erected upright discharge position, with the apex of the cone at the upper end thereof, thereby to propel the material from the upper diaphragm in a form of a circular, relatively thin flow stream discharged from around the base of the erected cone-shaped diaphragm in the form of a cascade, thereby to partially blend and commingle the combination of dry materials;

deflecting the materials which are discharged from the upper diaphragm into the lower diaphragm;

stopping and collecting said flow stream of dry materials in the lower diaphragm and thereby at least partially blending the mass of material;

shifting the lower diaphragm from the inverted depressed position to an erected upright position to form an erected cone with the apex of the cone at the top thereof, thereby to propel the partially blending mass of material from the second diaphragm in the form of a circular, relatively thin flow stream which is discharged from around the base of the cone in the form of a cascade;

again deflecting the partially blending mass of material to complete the blending action;

and thereafter collecting said mass of blended materials which are deflected from the second diaphragm.

30. A method of blending a combination of dry materials forming a mass comprising the steps of:

providing a generally cone-shaped diaphragm adapted to be depressed to an inverted shape to form a vessel for receiving a mass of said dry materials, with the apex of the cone-shaped diaphragm disposed at the lower end thereof;

feeding said combination of dry materials into said cone with the cone depressed inverted shape to form a vessel to receive said dry materials;

providing a housing formed of rigid material surrounding said diaphragm with the periphery of the diaphragm sealed with respect to the periphery of said housing;

supplying fluid pressure to the said housing, thereby to shift said cone-shaped diaphragm to said depressed position and to expand said diaphragm from said inverted depressed position to the form of an erected cone, with the apex of the cone at the top thereof, thereby to propel the mass of material from the diaphragm in the form of a circular, relatively thin flow stream which is discharged from around the base of the cone in the form of a cascade;

collecting the mass of material propelled from said cone-shaped diaphragm;

and thereafter applying vacuum to said pressure vacuum housing to shift said cone-shaped diaphragm back to said depressed inverted shape to form a vessel adapted to receive a subsequent mass of dry materials to be commingled upon the next erection of the cone-shaped diaphragm.

31. A method of blending a combination of dry materials forming a mass either of uniform or of varying particle sizes and of different specific gravities comprising the steps of:

providing a plurality of cone-shaped diaphragms formed of flexible material and disposed one above the other;

providing a pressure vacuum housing formed of rigid material surrounding each of said diaphragms, with the periphery of each diaphragm in sealed relationship with the periphery of its companion pressure vacuum housing;

said cone-shaped diaphragms adapted to be normally depressed to form a vessel in response to theh application of vacuum to the housing with the apex of the cone-shaped diaphragms disposed at the lower end thereof;

applying vacuum to the upper of said housings to depress the cone-shaped diaphragm with the apex of the cone-shaped diaphragm at the lower end thereof to form a vessel;

feeding said mass of dry materials in metered quantities into the depressed upper diaphragm;

applying pressure to the housing of the upper diaphragm, thereby to shift the diaphragm from said inverted receiving position to an erected upright position with the apex of the cone at the top thereof, thereby to propel the mass of material from the upper diaphragm in the form of a circular, relatively thin flow stream which is discharged from around the base of the cone in the form of a cascade;

applying vacuum to the pressure vacuum housing of the lower cone-shaped diaphragm, thereby depressing the diaphragm, with its apex disposed at its lower end to form a vessel adapted to receive the mass of material discharged from the upper diaphragm;

applying pressure to the housing of the lower cone-shaped diaphragm, thereby to shift the lower diaphragm from the inverted position with the apex disposed at the lower end thereof, to an erected position with the apex of the diaphragm disposed at the upper end thereof, thereby to propel the mass of material from the lower diaphragm;

and applying vacuum to the pressure vacuum housing of the upper diaphragm to shift said cone-shaped diaphragm back to said depressed inverted shape to form a vessel adapted to receive a subsequent mass of dry materials to be commingled.

32. A method of blending a combination of dry materials in a multiple stage operation, said materials forming a mass either of uniform or of varying particle sizes and of different specific gravities comprising the steps of:

providing a plurality of generally cone-shaped diaphragms formed of flexible material disposed one above the other and adapted to be shifted from an inverted receiving position with the apex thereof disposed at the lower end thereof to an erected discharge position with the apex of the cone disposed at the upper end thereof;

depressing the upper diaphragm to an inverted receiving position to form a vessel, with the apex of the cone-shaped diaphragm disposed at the lower end thereof to form a vessel;

feeding said mass of material into said upper diaphragm;

shifting the next lower diaphragm to said inverted receiving position;

shifting the upper diaphragm from said inverted receiving position to an erected upright discharge position, with the apex of the cone at the upper end thereof, thereby to propel the material from the upper diaphragm as a circular, relatively thin flow stream discharged from around the base of the erected cone-shaped diaphragm in the form of a cascade, thereby to partially blend and commingle the combination of dry materials;

deflecting the materials which are discharged from the upper diaphragm into the next lower diaphragm;

stopping and collecting said flow stream of dry materials in the next lower diaphragm and thereby at least partially blending the mass of material;

repeating the steps of discharging, deflecting and collecting the mass of material until the mass is blended;

and collecting the blended mass of material.

33. A method of progressively blending a combination of dry materials forming a mass either of uniform or of varying particle sizes and of different specific gravities comprising the steps of:

providing a plurality of cone-shaped diaphragms formed of flexible material and disposed one above the other;

said cone-shaped diaphragms adapted to be depressed to an inverted receiving position to form a vessel, with the apex of each cone-shaped diaphragm disposed at the lower end thereof and adapted to be shifted to an erected position, with the apex of the cone disposed at the upper end thereof;

feeding a first mass of material into the upper diaphragm with the upper diaphragm in said inverted receiving position;

shifting the next lower diaphragm to said depressed inverted receiving position to form a vessel, with the apex of the cone-shaped diaphragm disposed at the lower end thereof;

shifting the upper diaphragm from the said inverted receiving position to an upright discharge position with the apex of the cone disposed at the upper end thereof, thereby to propel the first mass of material from the upper diaphragm to the next lower diaphragm in said depressed receiving position, thereby to collect and stop the first mass of material, to partially blend and commingle the mass of dry materials;

shifting said upper diaphragm from the erected to the inverted receiving position;

feeding a second mass of material into said upper diaphragm while the first mass of material is confined in the second diaphragm;

shifting said second diaphragm from said inverted receiving position to an erected upright discharge position, thereby to propel the first mass of material from the second diaphragm;

repeating the steps of feeding, discharging and collecting successive masses of material, whereby a plurality of masses are blended concurrently through progressive stages;

and collecting the successive masses of blended material.

34. A method of progressively blending a combination of dry materials forming a mass either of uniform or of varying particle sizes and of different specific gravities comprising the steps of:

providing a plurality of cone-shaped diaphragms formed of flexible material and disposed one above the other;

said cone-shaped diaphragms normally depressed to an inverted receiving position to form a vessel, with the apex of each cone-shaped diaphragm disposed at the lower end thereof;

feeding a first mass of material into the first diaphragm with the diaphragm in said inverted receiving position;

shifting the second diaphragm to said normally depressed inverted receiving position to form a vessel, with the apex of the cone-shaped diaphragm disposed at the lower end thereof;

shifting the first diaphragm from the said inverted receiving position to an upright discharge position with the apex of the cone disposed at the upper end thereof, thereby to propel the first mass of material from the first diaphragm to the second diaphragm in said depressed receiving position, thereby to collect and stop the first mass of material and to partially blend and commingle the mass of dry materials;

shifting said first diaphragm from the erected to the inverted receiving position;

feeding a second mass of material into said first diaphragm while the first mass of material is confined in the second diaphragm;

providing at least a third diaphragm beneath said second diaphragm and shifting said third diaphragm to said inverted receiving position;

shifting said second diaphragm from said inverted receiving position to an erected upright discharge position, with the apex of the cone at the upper end thereof, thereby to propel the first mass of material from the second diaphragm and to discharge the same into the third diaphragm;

collecting the first mass of blended material which is discharged from said third diaphragm;

repeating the progressive steps of discharging successive masses of said dry materials concurrently;

and collecting each successive blended mass of dry materials.

References Cited

UNITED STATES PATENTS

| | | | |
|---|---|---|---|
| 1,047,680 | 12/1912 | Simpson | 259—150 X |
| 2,179,485 | 11/1939 | Avril | 259—180 |
| 2,792,262 | 5/1957 | Hathorn | 214—17 X |

WILLIAM I. PRICE, *Primary Examiner.*

R. W. JENKINS, *Assistant Examiner.*